(12) United States Patent
Schlanger

(10) Patent No.: US 9,758,209 B2
(45) Date of Patent: Sep. 12, 2017

(54) AXLE CONNECTOR ADAPTER ASSEMBLY

(71) Applicant: Raphael Schlanger, Wilton, CT (US)

(72) Inventor: Raphael Schlanger, Wilton, CT (US)

( * ) Notice: Subject to any disclaimer, the term of this patent is extended or adjusted under 35 U.S.C. 154(b) by 0 days.

(21) Appl. No.: 14/974,451

(22) Filed: Dec. 18, 2015

(65) Prior Publication Data

US 2016/0121961 A1 May 5, 2016

Related U.S. Application Data

(63) Continuation-in-part of application No. 14/958,263, filed on Dec. 3, 2015, and a continuation-in-part of application No. 14/952,645, filed on Nov. 25, 2015, and a continuation-in-part of application No. 14/602,543, filed on Jan. 22, 2015, now Pat. No. 9,561,833, and a continuation-in-part of application (Continued)

(51) Int. Cl.
*B62K 25/02* (2006.01)
*B60B 27/02* (2006.01)

(52) U.S. Cl.
CPC ............ *B62K 25/02* (2013.01); *B60B 27/026* (2013.01); *B62K 2025/025* (2013.01); *B62K 2206/00* (2013.01)

(58) Field of Classification Search
CPC .. B60L 327/026; B62K 25/02; B62K 2206/00
See application file for complete search history.

(56) References Cited

U.S. PATENT DOCUMENTS 3,610,659 A * 10/1971 Gerarde ................ B62K 21/02
280/169
4,424,981 A * 1/1984 Maxwell, III ......... B62K 25/02
280/279

(Continued)

FOREIGN PATENT DOCUMENTS

DE 102008045475 A1 * 1/2009 ............. B62K 25/02
TW DE 29702091 U1 * 3/1997 ........... B60B 27/023

OTHER PUBLICATIONS

Magazine article, from Bicycle Guide magazine, 1995. Author: John Derven. Printed from website www.classicrendesvous.com. Relating to Cinelli Bivalent bicycle hub.

(Continued)

*Primary Examiner* — Kip T Kotter

(57) ABSTRACT

An axle connector adapter assembly, including: a frame element with a first frame member; an axle extending along an axial axis and including an engagement end with a first threadable portion; and an adapter with a second threaded portion for threadable engagement with the first threadable portion. The first frame member includes an open slot with an open entrance portion, a closed terminus region, slot sidewalls extending between the open entrance portion and the closed terminus region, a slot axis, an axially outward facing first outboard face, and an axially inward facing first inboard face. The adapter is assembled to the first frame member to include a rotationally keyed engagement between the adapter and the first frame member to limit rotation of the threaded portion relative to the first frame member about the axial axis. The adapter is preferably axially retained to the first frame member.

20 Claims, 10 Drawing Sheets

Related U.S. Application Data

No. 13/914,490, filed on Jun. 10, 2013, now Pat. No. 9,446,626, which is a continuation-in-part of application No. 12/655,433, filed on Dec. 30, 2009, now Pat. No. 8,485,335.

(60) Provisional application No. 62/124,391, filed on Dec. 18, 2014, provisional application No. 61/965,201, filed on Jan. 27, 2014, provisional application No. 61/204,130, filed on Jan. 2, 2009.

(56) References Cited

U.S. PATENT DOCUMENTS

| | | | | |
|---|---|---|---|---|
| 5,984,423 | A * | 11/1999 | Becker | B60B 27/023 301/110.5 |
| 6,089,675 | A * | 7/2000 | Schlanger | B60B 27/023 280/279 |
| 8,042,881 | B2 * | 10/2011 | Inoue | B62K 23/06 280/279 |
| 8,777,330 | B2 * | 7/2014 | Lim | B62K 25/02 301/124.2 |
| 8,783,790 | B2 * | 7/2014 | Achenbach | B62K 25/02 301/124.2 |
| 2010/0096912 | A1 * | 4/2010 | Lude | B62K 25/02 301/110.5 |

OTHER PUBLICATIONS

Collection of Three Photographs of a Cinelli Bivalent Bicycle Hub. Printed from website www.classicrendezvous.com. Descriptive notation has been added by applicant.

* cited by examiner

AXLE CONNECTOR ADAPTER ASSEMBLY

CROSS-REFERENCE TO RELATED APPLICATIONS

This application claims priority of U.S. Provisional Patent Application 62/124,391, filed Dec. 18, 2014 and entitled "VEHICLE HUB ASSEMBLY".

This application is also a Continuation-In-Part of U.S. patent application Ser. No. 14/958,263, filed Dec. 3, 2015, which is currently pending, and which claimed priority of U.S. Provisional Patent Application 62/124,391, filed Dec. 18, 2014 and entitled "VEHICLE HUB ASSEMBLY".

U.S. patent application Ser. No. 14/958,263 is also a Continuation-In-Part of U.S. patent application Ser. No. 14/952,645 filed Nov. 25, 2015 and entitled "VEHICLE WHEEL AXLE ASSEMBLY", which is currently pending, and which claimed priority of U.S. Provisional Patent Application 62/124,391, filed Dec. 18, 2014 and entitled "VEHICLE HUB ASSEMBLY".

U.S. patent application Ser. No. 14/952,645 is also a Continuation-In-Part of U.S. patent application Ser. No. 14/602,543 filed Jan. 22, 2015 and entitled VEHICLE WHEEL AXLE ASSEMBLY, which is currently pending, and which claimed priority of U.S. Provisional Patent Application 61/965,201 filed Jan. 27, 2014.

U.S. patent application Ser. No. 14/602,543 is also a Continuation-In-Part of U.S. patent application Ser. No. 13/914,490 filed Jun. 10, 2013 and entitled VEHICLE WHEEL HUB ASSEMBLY, which is issued as U.S. Pat. No. 9,446,626, and which is a Continuation-In-Part of U.S. patent application Ser. No. 12/655,433 filed Dec. 30, 2009 and entitled TORQUE COUPLING ASSEMBLY, which is currently issued as U.S. Pat. No. 8,485,335.

U.S. Pat. No. 8,485,335 claimed priority of U.S. Provisional Patent Application 61/204,130 filed Jan. 2, 2009.

BACKGROUND

Field of the Invention

The present invention relates to a vehicle wheel axle connector adapter, particularly including the ability to adapt the axle to a frame dropout with an open slot. The adapter may provide a threaded portion to receive the axle and/or to receive a portion of the axle. More specifically, the adapter is rotationally keyed to the dropout to limit rotation of the adapter relative to the dropout to aid in the installation of the adapter to the dropout and/or the assembly of the axle to the adapter.

Discussion of Prior Art

Heretofore, in the case where the axle is threadably connected to the dropout of a bicycle frame, the external threads of the axle are threadably connected to an internally threaded hole formed directly into the dropout. Since such a closed threaded hole circumferentially surrounds the axle, it is considered a "closed dropout". In some cases, a closed dropout utilizes an internally threaded insert that is positioned within a "closed" hole of the dropout, which is also referred to as a "closed dropout". This is in contrast to the open slot commonly associated with bicycle dropouts, which is commonly referred to as an "open dropout", since the slot has an opening. Most open dropouts are designed to be used in conjunction with a quick-release skewer as a means to attach the axle to the bicycle frame.

With the advent of mountain bikes and disc brakes, and with the desire to have a more robust and stiff wheel attachment system, the through-axle has been utilized as a heavier-duty wheel attachment system to replace the quick-release skewer system. This through-axle commonly threads directly into the closed dropout of a frame or fork of the bicycle. There are also alternative wheel attachment designs, similar to that described in FIGS. 4a-f of U.S. Pat. No. 6,089,675 that utilize a closed dropout for threadable connection with the axle.

The problem is that most bicycles on the road today utilize an open dropout with an open slot. Thus, it is desirable to adapt the existing open dropout design to a closed dropout configuration that permits the threadable connection with an axle. One such adapter was utilized in the 1960's, when the short-lived Cinelli Bivalent hub system utilized an adapter that created an internally threaded hole in a conventional open slotted dropout. However, this Cinelli Bivalent adapter was difficult to use because the adapter was not rotationally locked or keyed to the dropout. As such, this adapter would have a tendency to twist and rotate as it was being assembled to the dropout by means of the clamp nut. Additionally, as the axle was threadably assembled and disassembled to the adapter, this twisting action would have a tendency to threadably loosen the threaded connection between the adapter and the clamp nut, thereby loosening the connection between the dropout and the adapter. This creates a grave safety concern, as a loose adapter may permit the wheel to become separated from the bicycle frame. Still further, since this adapter is not rotationally keyed to the dropout, the mechanic must exercise proper judgment and care to insure that the adapter is properly circumferentially aligned with the dropout. If the mechanic makes an error, then the geometry of the adapter may bot be properly aligned to receive the axle and the hub. All of these limitations and shortcomings, among others, of the Cinelli Bivalent adapter makes this system unsuitable for utilization with modern bicycles, particularly when disc brakes or other hub-mounted braking systems are utilized.

SUMMARY OF THE INVENTION

Objects and Advantages

In accordance with the present invention, it has now been found that the forgoing objects and advantages may be readily obtained.

It is an object of the invention to provide an axle connector adapter to facilitate assembly of the adapter to the dropout. It is a further object of the invention to facilitate assembly of the axle to the adapter. It is a yet further object of the invention to maintain the optimal circumferential alignment of the adapter relative to the dropout.

The present invention includes a mechanical keyed engagement between the adapter and the dropout to limit rotation therebetween about the axial axis. In a preferred arrangement, this keyed engagement serves to circumferentially lock the adapter to the dropout.

In a preferred configuration, the adapter may be joined to the dropout by means of a clamp nut that threads onto the adapter to axially clamp and sandwich the dropout, as described herein. As the clamp nut is threadably assembled to the adapter, the threadable tightening of the clamp nut may tend to circumferentially twist the adapter in an uncontrolled manner. The keyed engagement of the present invention serves to reduce or eliminate this twist and thus facilitates the assembly of the adapter to the dropout.

Further, when the axle is threadably mated to the adapter, this threadable tightening may serve to apply a torque to the adapter about the axial axis. In the absence of the keyed engagement, threadable tightening/loosening of the axle relative to the adapter may tend to circumferentially twist the adapter in an uncontrolled manner. If a clamp nut is utilized, this may also serve to loosen the threadable engagement between the clamp nut and the adapter. However, the keyed engagement of the present invention serves to reduce or eliminate this twist and thus facilitates the assembly of the axle to the adapter and also insures that the clamp nut will not be inadvertently loosened. Thus, beyond facilitating the smooth and controlled threadable connection between the axle and the adapter, this keyed engagement also provides a safety feature that insures that the adapter (and the axle to which it is connected to) remains firmly connected to the dropout.

Still further, when the adapter is assembled to the dropout, the circumferential alignment therebetween may be important. For example, when the adapter includes an alignment surface, it is important that this alignment surface be circumferentially positioned relative to the dropout in order to achieve proper functionality of this alignment surface. The keyed engagement of the present invention insures that the adapter will have the proper and accurate circumferential positional alignment with the dropout when these two components are assembled together. This alignment will also be maintained as these two components are tightened and/or secured to each other. In the absence of this keyed engagement, it is up to the assembler to judge the proper circumferential alignment, which opens the possibility for alignment error and inaccuracy.

Further objects and advantages of my invention will become apparent from considering the drawings and ensuing description.

BRIEF DESCRIPTION OF THE DRAWINGS

The present invention will be more readily understandable from a consideration of the accompanying drawings, wherein:

FIG. 2c shows the adapter and nut assembled to one dropout and the hub assembly axially aligned in preparation for assembly with the dropouts, and with the control shaft in the retracted position;

FIG. 2d shows the hub assembly positioned between the dropouts, with each axlecap radially nested within its respective adapter and slot, and with the control shaft still in the retracted position;

FIG. 2e shows the hub assembly positioned between the dropouts, with the control shaft axially extended and threadably engaged with the adapter in the engaged position to secure the hub assembly to the dropouts;

FIG. 2f shows the hub assembly as positioned in FIG. 2e, with the handle pivotally folded;

FIG. 2g shows the hub assembly positioned between the dropouts, with the control shaft axially retained in the retracted position, corresponding to the assembly sequence described in FIG. 2d;

FIG. 2h shows the hub assembly positioned between the dropouts, with the control shaft in the pre-engaged position such that it is axially released and advanced toward the extended orientation, corresponding to an intermediate assembly sequence between FIGS. 2d and 2e;

FIG. 2i shows the hub assembly positioned between the dropouts, with the control shaft in an engaged position such that it is axially extended and threadably engaged with the dropout adapter, and with the handle pivotally folded, corresponding to the assembly sequence described in FIG. 2f;

FIG. 2p is an exploded view, showing the adapter and clamp nut in position for assembly to the dropout;

FIG. 2q is an exploded view, showing the adapter positioned within the open slot of the dropout;

FIG. 2r shows the clamp nut threadably assembled to the adapter and tightened to axially clamp and grip the dropout.

DETAILED DESCRIPTION OF THE INVENTION

Figure 1:
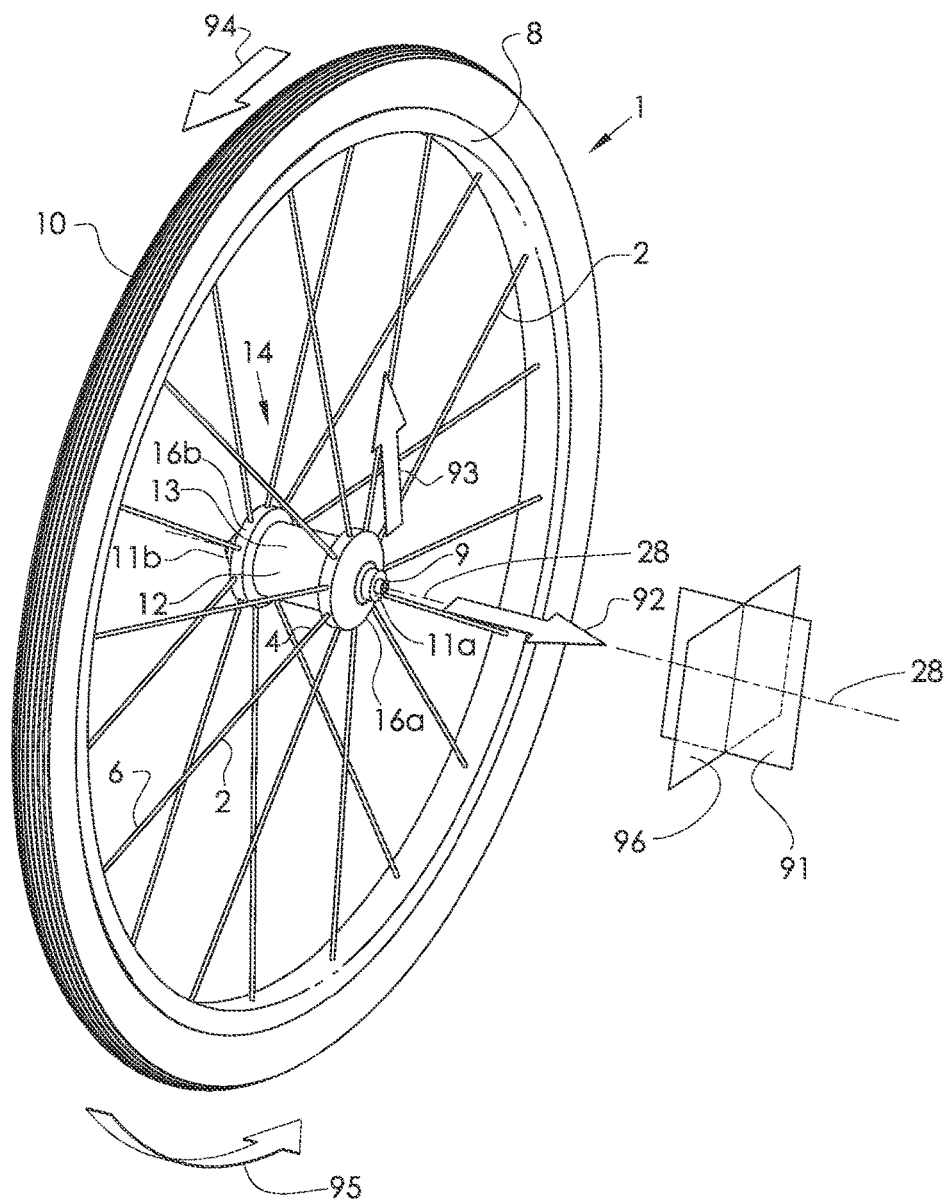
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. The hub assembly 14 includes a rotatable hub shell 12 and a stationary axle 9, with bearings (not shown) to facilitate rotation of the hub shell 12 about the axial axis 28. The hub shell 12 includes a hub body 13 with at least two axially spaced hub flanges 16a and 16b, each of which include a means for connecting with the spokes (not shown). The axle 9 includes end faces 11a and 11b to interface with the dropouts (not shown). The axial axis 28 is the axial centerline of rotation of the bicycle wheel 1. The hub flanges 22a and 22b may be contiguous with the hub shell 12 or may be separately formed and assembled to the hub body 13 portion of the hub shell 12. The spokes 2 are affixed to the hub flanges 22a or 22b at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is a direction parallel with the axial axis 28. The radial direction 93 is a direction generally perpendicular to the axial direction 92 and extending generally from the axial axis 28 radially outwardly toward the rim 8. The tangential direction 94 is a direction perpendicular to both the radial direction 93 and axial direction 92, defining a generally tangent vector at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 91 is a plane that is generally parallel to the axial axis.

In the ensuing descriptions, the term "axial" refers to a direction parallel to the centerline of the axial axis and the term "radial" refers to a direction perpendicular to the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard (or inward) orientation is an orientation that is radially proximal to the axial axis 28 and a radially outboard (or outward) orientation is an orientation that is radially distal to the axial axis 28. An axially inboard (or inward) facing surface is a surface that faces toward the axial midpoint between the two end faces 11a and 11b. Conversely, an axially outboard (or outward) facing surface is a surface that faces away from the axial midpoint between the two end faces 11a and 11b.

While it is most common for the hub shell 12 to rotate about a fixed axle 9, there are some cases where it is desirable to permit the axle 9 to be fixed with the wheel 1 such as the case where the wheel 1 is driven by the axle 9.

For general definition purposes herein, an "integral" joinder or assembly is one that is integrated and may not be easily disassembled at the service temperature without damaging at least one of the components that are joined, or is difficult to disassemble, or is otherwise not meant to be disassembled. This integral joinder involves a joining interface directly between two components. This joining interface is often a welded or adhered interface or some other interface where the two joining surfaces are solidly joined to each other to create a unified structure. Preferably this joining interface is a surface interface, rather than a point or edge interface. The integral joinder is in contrast to a fastened joinder, where such a fastened joinder relies solely on a mechanically interlocked engagement to secure or connect the two components to each other. The term "integral" refers to two portions that are unitary, and/or integrally joined. Further, when two portions are considered "monolithic" with each other, they may be considered to be integrally and monolithically combined as a singular element.

Figure 2A:
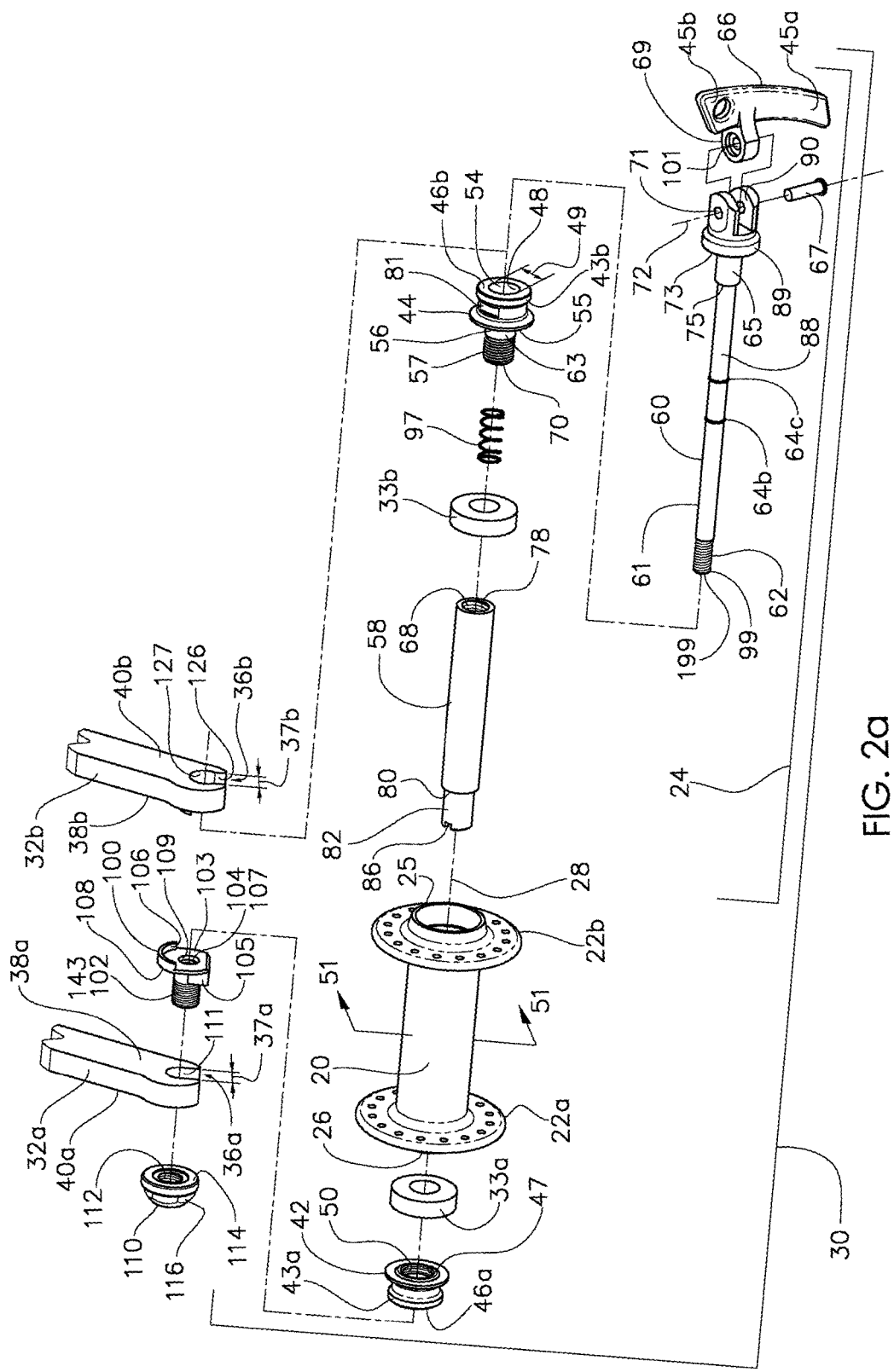
FIG. 2a is an exploded perspective view of a first embodiment of the present invention, showing the dropouts of the bicycle frame and a hub assembly, including a control shaft assembly.
Figure 2B:
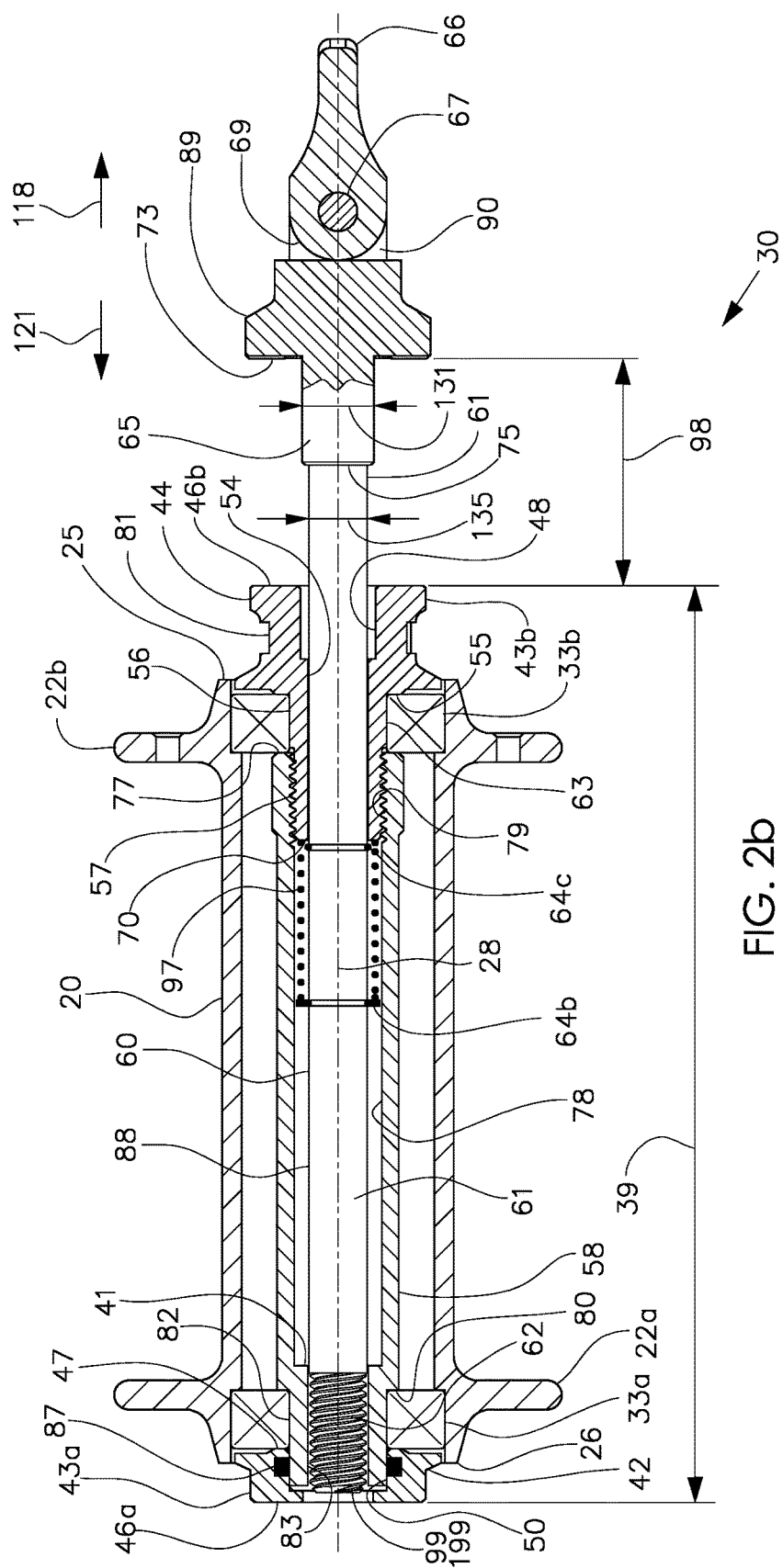
FIG. 2b is an axial cross-sectional view taken along 51-51 of the hub assembly of the embodiment of FIG. 2a, with the control shaft axially retained with the sleeve and positioned in the axially retracted position.
Figure 2C:
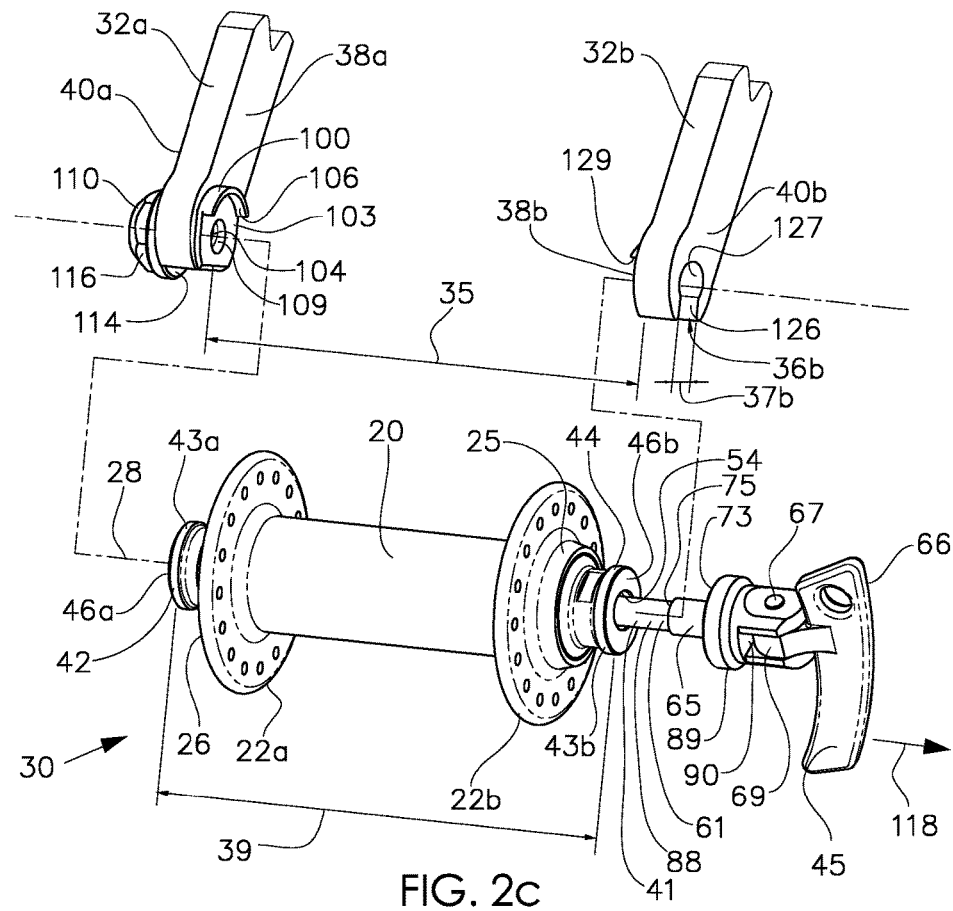
FIGS. 2c-f are perspective views of the embodiment of FIG. 2a, showing the progressive sequential assembly steps involved in assembling the hub assembly to the dropouts.
Figure 2D:
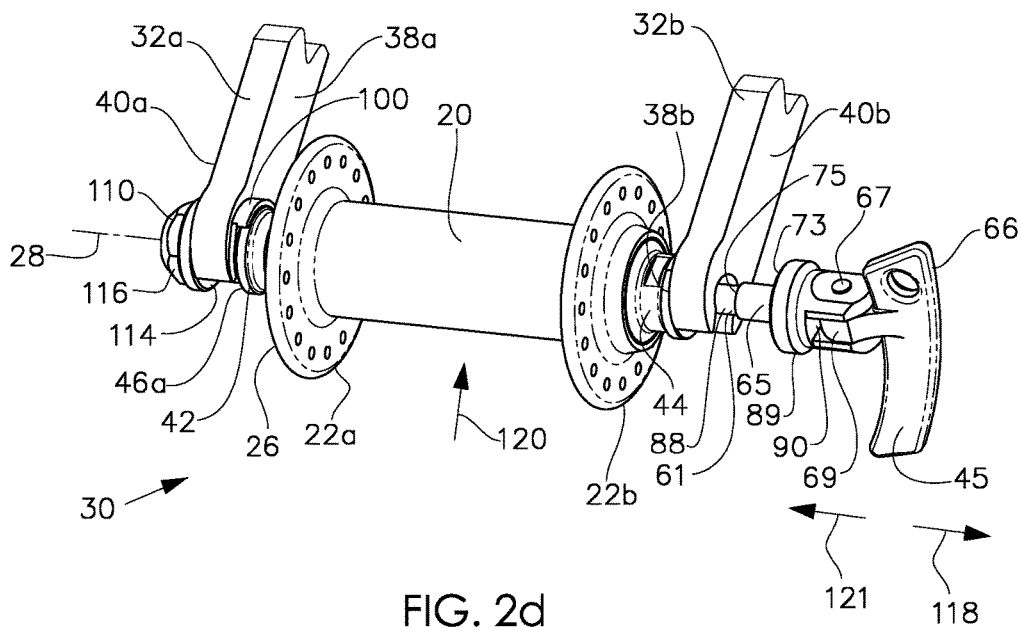
Figure 2E:
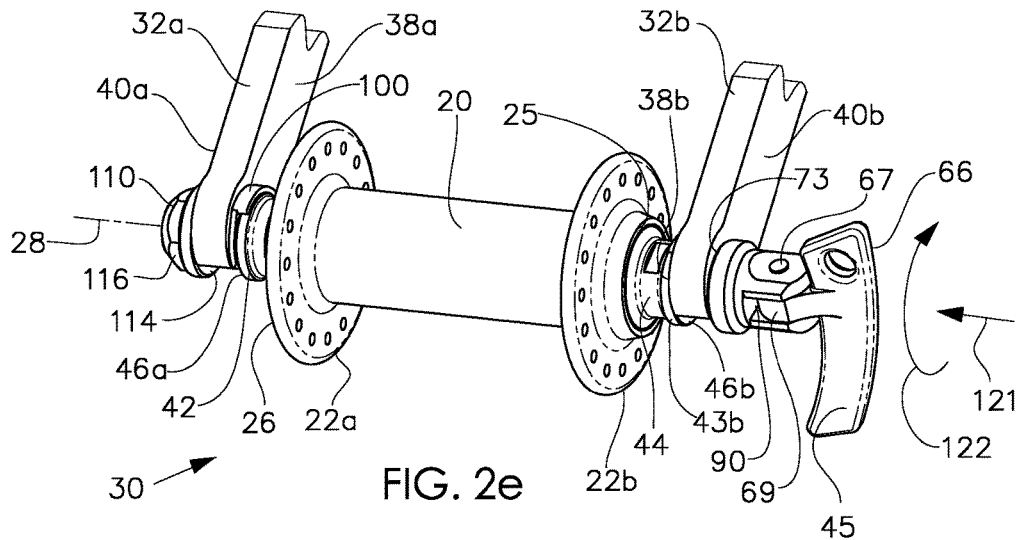
Figure 2F:
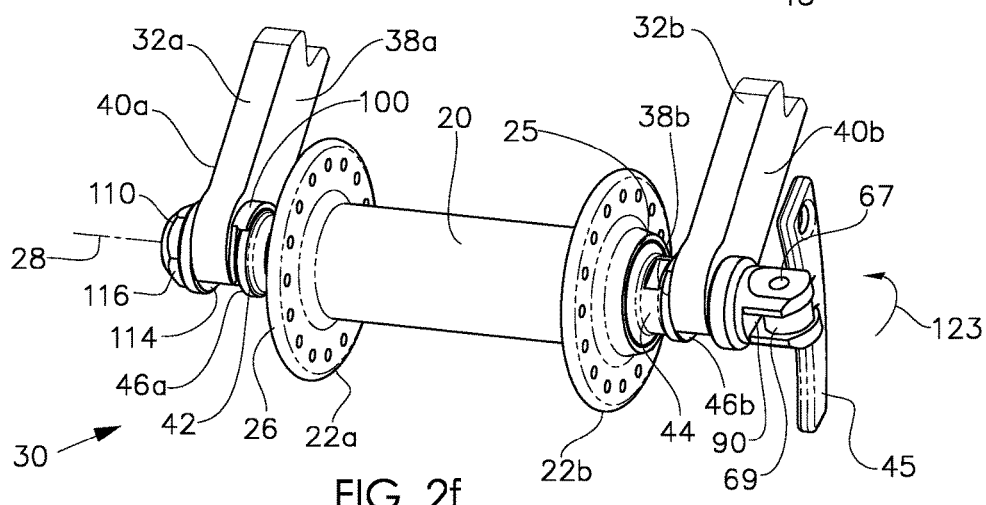
Figure 2G:
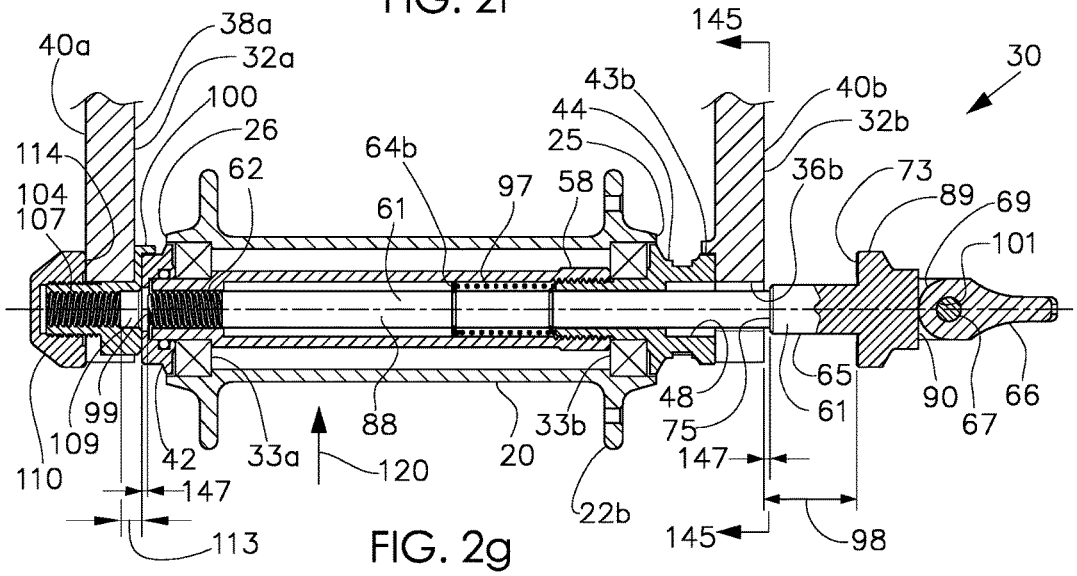
FIGS. 2g-i are axial cross-sectional views taken along 51-51 of the embodiment of FIG. 2a, showing the progressive sequential steps involved in assembling the hub assembly to the dropouts.
Figure 2H:
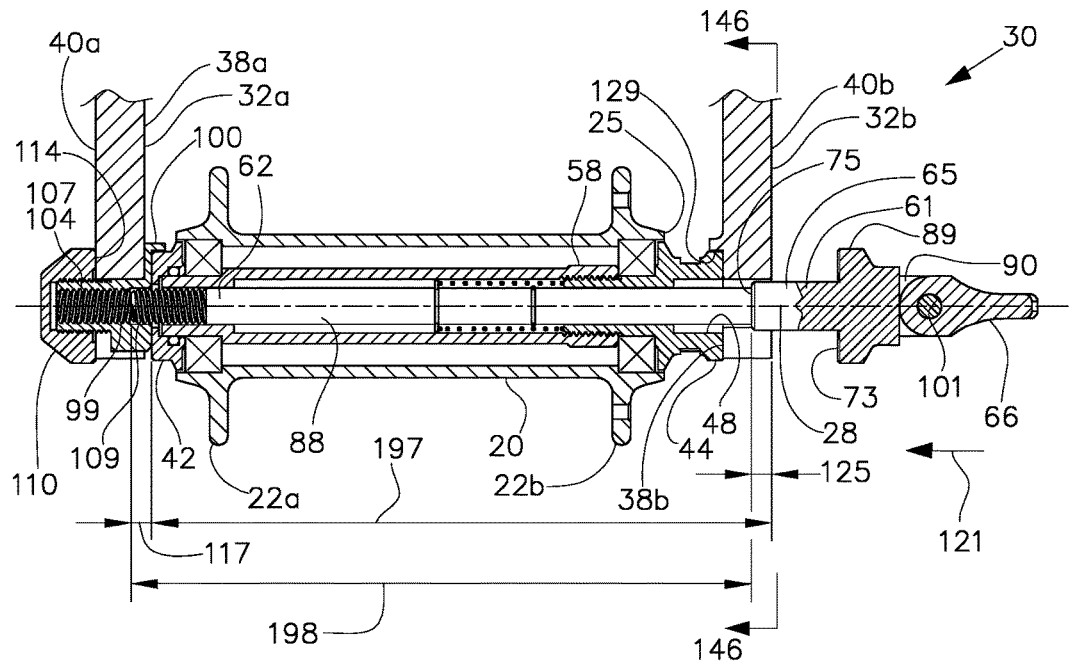
Figure 2I:
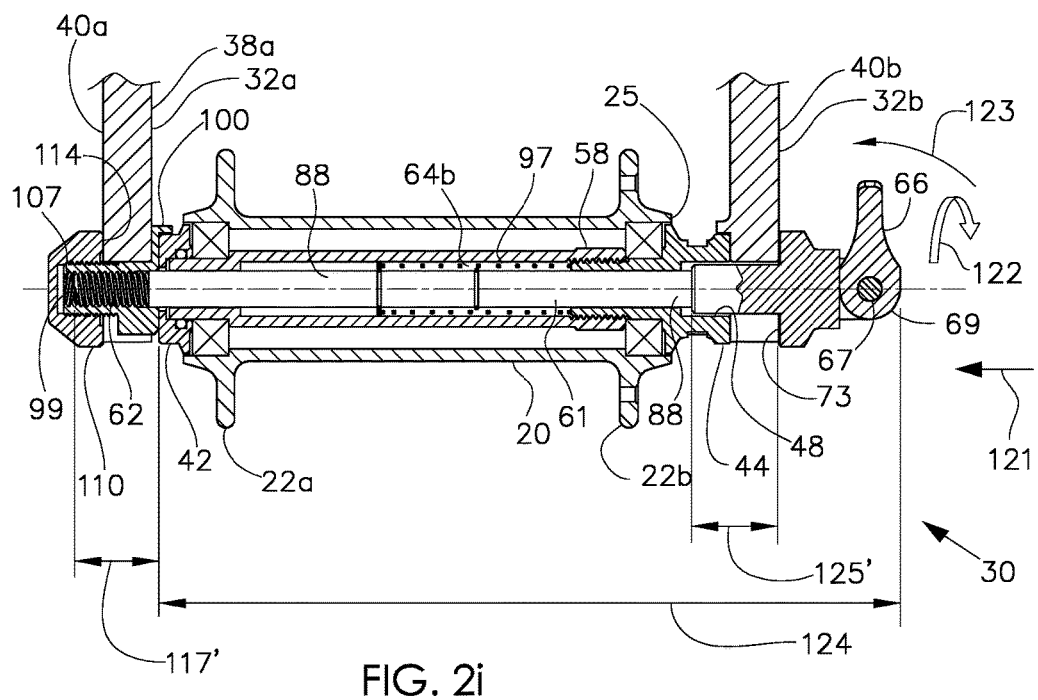
Figure 2J:
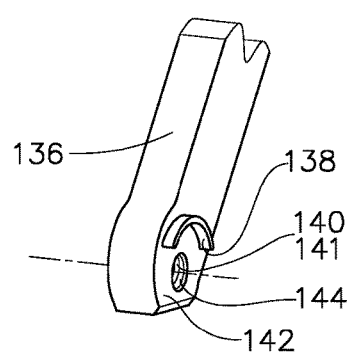
FIG. 2j is a perspective view of an alternate (left) dropout corresponding to the view of FIG. 2a, where the adapter and nut are eliminated in favor of an alternate dropout configuration that includes geometry otherwise associated with the adapter, including the alignment surface and internally threaded hole.
Figure 2K:
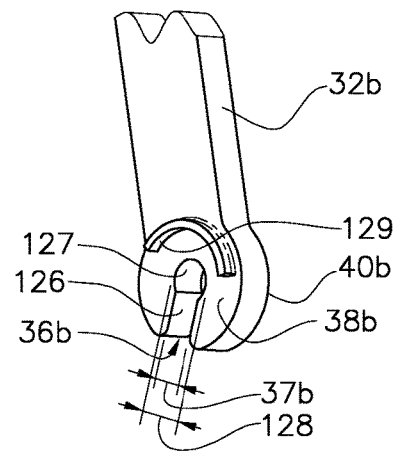
FIG. 2k is a perspective view of the right dropout of the embodiment of FIG. 2a, detailing the open keyhole dropout slot.
Figure 2L:
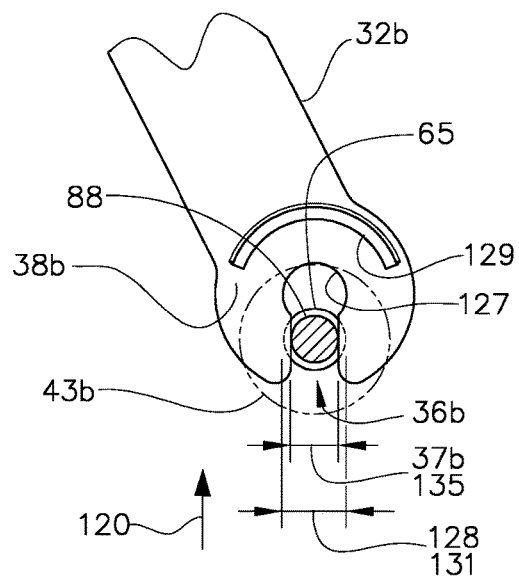
FIG. 2L is a partial cross section view of the embodiment of FIG. 2g, taken along 145-145, detailing the interaction between the control shaft and the right dropout, and corresponding to the transition between the assembly sequence of FIG. 2c and the assembly sequence of 2d, with the shank portion of the control shaft passing within the necked entrance region of the keyhole slot.
Figure 2M:
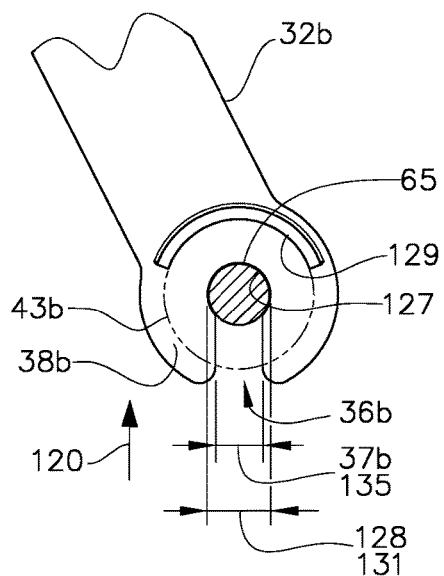
FIG. 2m is a partial cross section view of the embodiment of FIG. 2h, taken along 146-146, corresponding to the assembly sequence of FIG. 2e, FIG. 2f, FIG. 2h, and FIG. 2i, with the control shaft axially advanced toward the engagement position such that the stepped portion is positioned within the pilot region of the keyhole slot.
Figure 2N:
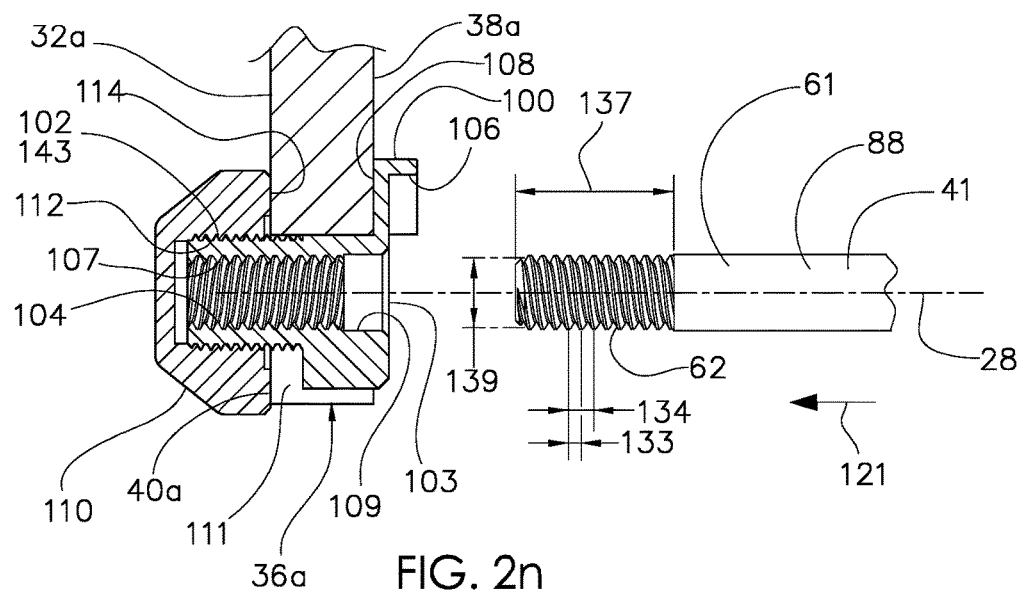
FIG. 2n is a partial cross sectional detail view of the embodiment of FIG. 2a, corresponding to the retracted position of FIGS. 2d and 2g, showing the counterbore of the adapter and the control shaft in greater detail, including description of the multiple-lead thread.

FIGS. 2a-n describe an embodiment of the present invention with a threaded engagement between a control shaft of a hub assembly 30 and the dropout of the frame. This threaded engagement includes a multiple-lead thread engagement. In this embodiment, the frame includes an open-slotted dropout axially opposed to this threaded engagement, for quick and easy wheel removal. FIG. 2a is an exploded view, showing the individual components of this embodiment.

Referring to FIGS. 2a-n and 2p-r, dropouts 32a and 351 (left dropout) and 32b (right dropout) may be considered mounting portions of the bicycle (not shown) and constitute the portion of the frame (not shown) to which the hub assembly 30 is mounted or connected. Left dropout 32a is of a generally conventional design and includes an open slot 36a of slot width 37a between sidewalls 111, a slot axis 144a extending radially along the open slot 36a, an axially inboard face 38a, and axially outboard face 40a. Right dropout 32b, as also shown in FIG. 2k, includes an open keyhole slot 36b that is radially stepped to include a narrower necked entrance region 126 of radial width 37b and a wider enlarged circular pilot region 127 of radial width 128. This radial step occurs within the axial region between inboard face 38b and outboard face 40b. Dropout 32b also includes an axially inboard face 38b, an axially outboard face 40b, and a slot axis 144b that extends generally radially along open keyhole slot 36b. Inboard face 38b also includes an axially inwardly projecting alignment face 129 to provide radial positioning location of the alignment surface 43b of axlecap 44. Open keyhole slot 36b has a radially extending open entrance to receive the control shaft assembly 60. Slot axis 144a and 144b are shown here to extend in a direction generally perpendicular to the axial axis 28.

Inboard faces 38a and 38b are axially opposed and face each other, while outboard faces 40a and 40b are axially opposed and face away from each other. Width 37a between sidewalls 111 of open slot 36a is sized to receive flats 105a and 105b (obscured) of adapter 100. Width 37b of the necked entrance region 126 of open slot 36b is sized to receive the shank portion 88 of the control shaft 61 and width 128 (shown in FIG. 2k) of the pilot region 127 is sized to receive stepped portion 65. The dropouts 32a and 32b shown here are more typical of the front dropouts of a bicycle frame, but the rear dropouts may be similar in design and it is understood that this design is representative of a wide range of dropout designs, either conventional or unconventional.

The hub assembly 30 includes an axle assembly 24 (and also including axlecap 42), bearing assemblies 33a and 33b, and hub shell 20. In this case, the axle assembly 24 is generally stationary and fixed to the frame of the bicycle, while the hub shell 20 is rotatable about axial axis 28 and about the axle assembly 24 by means of bearing assemblies 33a and 33b. Bearing assemblies 33a and 33b are shown here as conventional "cartridge" type bearing assemblies, including rolling elements, an inner race and an outer race. The hub shell 20 includes two hub flanges 22a and 22b that are adapted to connect with the first ends of spokes (not shown) in the conventional manner. Hub shell 20 includes a second end portion 25 axially disposed to be proximal to handle 66 of the control shaft assembly 60 and to outer face 46b, and a first end portion 26 axially disposed to be distal the handle 66 relative to the second end portion 25 and to be axially proximal outer face 46a. The axle assembly 24 includes axlecap 42, axlecap 44, sleeve 58, and control shaft assembly 60. The control shaft assembly 60 includes the control shaft 61 with spring 97, snaprings 64b and 64c, handle 66, and pivot pin 67. The handle 66 includes radially projecting lever portions 45a and 45b to afford additional tightening torque and leverage when the handle 66 is manipulated by the operator. The handle 66 also includes a pivot tab 69 with a hole 101 therethrough. The sleeve 58 includes an axial opening 78 therethrough with a shoulder 41, and with internal threads 79. Sleeve 58 also includes end face 77, shoulder 80, collar 82, and hole 83 that is sized to accept and preferably to pilot the control shaft 61.

Concentric and coaxial within the sleeve 58 is the control shaft 61, which is both (axially) slidable and rotatable within the sleeve 58 about the axial axis 28. Control shaft 61 includes a shank portion 88 and an enlarged head portion 89, with a grip face 73 serving as a transition surface between shank portion 88 and head portion 89. The shank portion 88 extends axially inwardly from the grip face 73 and includes a cylindrical stepped portion 65 of larger diameter 131 and a shank portion 88 that is concentric with stepped portion 65 and is of smaller diameter 135 such that there is a step or transition surface 75 therebetween. The shank portion 88 may be considered as a radially relieved surface relative to the stepped portion 65 and the stepped portion 65 may be considered as a radially enlarged surface relative to the shank portion 88. The shank portion 88 includes end face 199, and external threads 62 at its engagement end adjacent end portion 99. End face 199 and transition surface 75, which correspond to first and second leading engagement edges of the control shaft 61 respectively, are axially separated by engagement distance 198. The head portion 89, including grip face 73, extends axially outwardly from the grip face 73 and includes a slot 90 to accept the pivot tab 69 of the handle 66, and a cross hole 71 sized to accept the pivot pin 67. Control shaft 61 extends through axlecaps 42 and 44 and sleeve 58 and includes end portion 99 with external threads 62 at its engagement end. Control shaft 61 further includes snaprings 64b and 64c, each nested and engaged in corresponding circumferential snapring grooves, at specific axial locations along its length. Snapring 64b provides an axial end stop for compression spring 97, which is positioned between snapring 64b and end face 70, and which serves to axially bias the control shaft assembly 60 in direction 121 relative to the sleeve 58. Snapring 64c serves to provide an axial travel limit stop for the control shaft assembly 60 relative to the axlecap 44 and to retain the control shaft assembly 60 to the rest of the hub assembly 30.

Axlecap 44 includes outer face 46b, shoulder 55, counterbore 48, collar portion 56, cylindrical alignment surface 43b, end face 70, and an axially extending hole 54 therethrough. Axlecap 44 also includes flats 81 for rotational manipulation with a wrench (not shown). Collar portion 56 includes a threaded portion with external threads 57 to mate with internal threads 68 of the sleeve 58 and a smooth cylindrical portion 63 to pilot the inside diameter of bearing 33b. The diameter 49 of counterbore 48 is sized to receive stepped portion 65.

Axlecap 42 includes end face 46a, face 47, cylindrical alignment surface 43a, and an axially extending hole 50 sized to accept collar 82. Outer faces 46a and 46b are generally axially opposed and face away from each other and preferably have a fixed axial distance 39. Holes 50 and 54 constitute the exposed openings of a continuous axial hole that extends through the sleeve 58 to accept the control shaft 61.

Adapter 100 is also detailed in FIG. 2n and includes externally threaded collar 102, flats 105a and 105b, axial hole 104, shoulder 108, end face 103, and a concave alignment surface 106. Collar 102 includes external threads 143 for threadable assembly with clamp nut 110. Hole 104 includes a counterbore 109 portion that extends axially from end face 103 through a portion of hole 104 by depth 113 (FIG. 2g) and that is of a diameter sized to accept the major diameter of external threads 62 of the control shaft 61. Hole 104 also includes an internally threaded portion with internal threads 107 extending axially from the base of the counterbore 109 axially outwardly through the remainder of the collar 102. Internal threads 107 are sized to threadably mate with external threads 62 of the control shaft 61. Flats 105a and 105b create a noncircular profile and are sized to engage and key with the sidewalls 111 of slot 36a, resulting in a circumferential blocking engagement therebetween to prevent the adapter 100 from rotating about the axial axis 28. Flats 105a and 105b also serve to prevent the adapter 100 from rotating relative to the clamp nut 110 during assembly with dropout 32a and also to maintain the desired orientation (about the axial axis 28) of the adapter 100. The engagement between flats 105a and 105b and slot 36a also serve to maintain the proper alignment of the adapter 100 about the axial axis 28. Flats 105a and 105b may be considered as engagement surfaces of the adapter 100 that are rotatably keyed to sidewalls 111, which may be considered as mating engagement surfaces of the dropout 32a. Clamp nut 110 includes internally threaded hole 112, end face 114, and flats 116. Adapter assembly 34 includes adapter 100 and clamp nut 110.

The adapter 100 is first pre-assembled to dropout 32b such that collar 102 and flats 105a and 105b are nested within slot 36a to extend therein, with shoulder 108 axially abutting inboard face 38a. Flats 105a and 105b are aligned and keyed with sidewalls 111 of the slot 36a. Clamp nut 110 is then threaded onto adapter 100 with internal threads 143 of hole 112 threadably mated to external threads of collar 102, such that end face 114 is axially abutting outboard face 40a. The clamp nut 110 is then further threadably tightened against the adapter 100, by means of a wrench (not shown) engaged to flats 116 to sandwich, clamp, and grip the dropout 32a, with end face 114 bearing and gripping against outboard face 40a and shoulder 108 bearing and gripping against inboard face 38a. The keyed engagement between flats 105a and 105b and sidewalls 111 prevents the adapter 100 from rotating while the clamp nut 110 is tightened and also maintains the desired alignment of the adapter 100 relative to the dropout 32a, insuring that other features, such as the alignment surface 106, is in proper alignment to receive the hub assembly 30. This rotatably fixed engagement also insures that the adapter 100 will not spin about the axial axis 28 when the external threads 62 are threadably mated with internal threads 107. With the adapter 100 assembled to dropout 32a, internal threads 107 now extend to axially overlap the open slot 36a. End face 103 is axially spaced from inboard face 38b by frame spacing distance 35 that corresponds to the axial hub spacing distance 39 between outer faces 46a and 46b. For the purposes of definition herein, a rotatably keyed engagement is a circumferentially blocking engagement that limits the relative circumferential movement or displacement between two parts. In the embodiments described herein it is preferable that the rotatably keyed engagement be a close engagement that does not allow for a significant amount of circumferential rocking or free-play between the two parts (i.e. dropout part and adapter part).

As shown in FIG. 2b, which details the hub assembly 30 and corresponds to the retracted position of the control shaft assembly 60, shoulder 80 axially abuts the inner race of bearing assembly 33a and end face 77 axially abuts the inner race of bearing assembly 33b. Outer races of bearing assemblies 33a and 33b are radially and axially fixed in the hub shell 20 in the conventional manner as shown. Thus, sleeve 58 is axially fixed relative to the hub shell 20, with the hub shell 20 rotatable about the sleeve 58 via bearings 33a and 33b about the axial axis 28. Axlecap 44 is threadably assembled to the sleeve 58 as shown, with external threads 57 mated to internal threads 79 and with shoulder 55 axially abutting the inner race of bearing assembly 33b. End face 77 and shoulder 55 serve to axially sandwich and locate the inner race of bearing assembly 33b. Collar portion 56 extends through the inner race of bearing assembly 33b. Similarly, collar 82 extends through the inner race of bearing 33a and within hole 50 to also pilot the axle cap 42. Shoulder 80 and face 47 serve to axially sandwich and locate the inner bearing race of bearing assembly 33a. The opening 78 of sleeve 58 is stepped from a larger diameter adjacent the end face 77 for clearance with spring 97 to the smaller diameter of hole 83 adjacent the collar 82 for radial piloting of the control shaft 61. Sleeve 58 also includes notches 86 at the engagement end for rotational manipulation with a mating wrench (not shown) about the axial axis 28. The assembled axle assembly 24 preferably provides a fixed axial distance between outer faces 46a and 46b as is conventional.

Snapring 64c provides an axial displacement limit stop relative to the axle assembly 24. In the case where the control shaft assembly 60 is withdrawn too far in direction 118, the snapring 64c will abut end face 70 and limit its travel. As such, snapring 64c also serves to insure that the control shaft 61 is positively retained with the axle assembly 24, serving as a convenience to prevent the control shaft assembly 60 from becoming separated from the hub assembly 30. The control shaft 61 also includes head portion 89 with grip face 73, slot 90, and cross hole 71. The pivot tab 69 of the handle 66 is assembled to the head portion 89 by first inserting pivot tab 69 into slot 90 and then inserting pivot pin 67 through cross hole 71 such that the handle 66 is engaged to the head portion 89 in a clevis hinge arrangement. The handle 66 may now be pivoted about the pivot axis 72 relative to the control shaft 61.

For explanation purposes and referring to FIGS. 2a-b, it is understood that an orientation described as "clamp end" or "handle end" refers to an axial location proximal to the handle 66 and distal the end portion 99. Conversely, an orientation described as "toward the engagement end" or "engagement end" refers to an axial location proximal to the end portion 99 and distal the handle 66. The handle end may also be termed the "control end".

FIG. 2b shows the assembled hub assembly 30, with the handle 66 assembled to the control shaft 61 by means of pin 67. The handle 66 is shown to be pivoted to its open or unfolded position to facilitate its manual manipulation. Control shaft 61 is extending through hole 54 and with spring 97 constrained between end face 70 and snapring 64b. Axlecap 44 is threadably assembled to the sleeve 58 as described above. This threadable assembly may be tightened with the aid of wrenches (not shown) engaged with flats 81 and with notches 86 to axially sandwich the inner race of bearing assembly 33b. A portion of collar 82 protrudes through bearing 33a to axially overlap and radially pilot the hole 50 of axlecap 42, with o-ring 87 providing a frictionally gripped retaining means therebetween in the conventional manner.

The compression spring 97 surrounds the control shaft 61, with its ends constrained and abutting the snapring 64b of the control shaft 61 and the end face 70 of the axlecap 44. With the control shaft assembly 60 in the retracted position, as shown in FIGS. 2b-c, the compression spring 97 is axially compressed and pre-loaded to provide a bias force to axially shuttle the control shaft assembly 60 in direction 121 towards its extended position as shown in FIGS. 2e and 2i. The term "axial shuttle" refers to an axial displacement that may or may not include rotation about the axial axis 28.

The control shaft 61 is shown in FIGS. 2b-c to be in the axially retracted position relative to the sleeve 58 and axle assembly 24. The control shaft assembly 60 has been axially withdrawn toward the handle end in direction 118 (the "retracted direction") until snapring 64c contacts the end face 70. This retracted position causes the spring 97 to be compressed to axially bias the control shaft assembly 60 in direction 121. In this retracted position, the axial gap 98 between outer face 46b and grip face 73 is considered "open" and there is axial clearance 147 (shown in FIG. 2g) between outboard face 40b and transition surface 75 adjacent the handle end. Additionally, in this retracted position, the end face 199 of the control shaft 61 may be flush or slightly axially inwardly recessed by recess distance 148 relative to the outer face 46a as shown. It is preferred that axial clearance 147 is equal or close to the recess distance 148 so that the end portion 99 is axially disengaged from the counterbore 109 by the same or similar amount as the transition surface 75 is disengaged from the pilot region 127.

FIG. 2c shows adapter 100 and clamp nut 110 as firmly assembled to grip the left dropout 32a as described hereinabove. Once firmly secured to the dropout 32a, the adapter 100 may be considered as an extension of the dropout 32a. The hub assembly 30 is shown positioned prior to its assembly with the dropout 32b and adapter 100. The handle 66 is in its unfolded and open position. The operator has pulled the handle 66 in direction 118 to insure that the control shaft assembly 60 is in the retracted position, with gap 98 open and expanded and with the end portion 99 (i.e. engagement end) end of the control shaft assembly 60 recessed from outer face 46a. The transition surface 75 is preferably axially aligned to be axially coincident or axially outboard of the outer face 40b such that the shank portion 88 is axially aligned with open slot 36b. Outer face 46a is also generally axially aligned with end face 103 and outer face 46b is generally axially aligned with inboard face 38b. The handle 66 serves to provide geometry for the operator to easily manipulate and control the control shaft assembly 60 as described herein. As a convenience and to prevent the operator from retracting the control shaft assembly 60 too far in direction 118, snapring 64c is provided to bear against the end face 70 of the axlecap 44 as a positive axial travel limit stop. It is noted that, as shown in FIGS. 2a-n, the control shaft assembly 60 is axially retained and engaged to the hub assembly 30 such that the control shaft assembly 60 may not be inadvertently removed from the hub assembly 30.

Next, as shown in FIGS. 2d and 2g, the hub assembly 30 is moved in the generally radial direction 120 relative to the dropouts 32a and 32b such that alignment surface 43a is radially abutting and nested with alignment surface 106 and alignment surface 43b is radially abutting and nested with alignment surface 129 to provide radial alignment between the hub assembly 30 and dropouts 32a and 32b. These nested engagements serve to provide a radial depth stop of the hub assembly 30 relative to the dropouts 32a and 32b in the conventional manner. Outer face 46a is also adjoining end face 103 while outer face 46b is also adjoining inboard face 38b to provide axial alignment between the hub assembly 30 and dropouts 32a and 32b. The external threads 62 are now radially aligned with counterbore 109 and the stepped portion 65 is now radially aligned with pilot region 127.

The radially position engagement between alignment surfaces 43a and 43b and respective alignment surfaces 106 and 129 is provided as a convenience to center and radially pre-align the control shaft 61 with hole 104 and pilot portion 127 respectively. This pre-alignment may serve to permit the smooth and unrestricted axial shuttling and circumferential rotation of the control shaft 61 during the assembly and disassembly of the hub assembly 30 with the dropouts 32a and 32b as described herein. Alternatively, other geometries and/or arrangements may be utilized to provide this radial pre-alignment. In the absence of such a pre-alignment engagement, the control shaft may bear directly against the dropouts 32a and 32b, which may result in binding and friction therebetween, which could impede the smooth and unrestricted axial shuttling and circumferential rotation of the control shaft 61.

The handle 66 serves to provide geometry for the operator to easily manipulate and control the control shaft assembly 60 as described herein. As a convenience and to prevent the operator from retracting the control shaft assembly 60 too far in direction 118, snaping 64c is provided to bear against the end face 70 of the axlecap 44 as a positive axial travel limit stop. It is noted that, as shown in FIGS. 2a-n, the control shaft assembly 60 is axially retained and engaged to the hub assembly 30 such that the control shaft assembly 60 may not be inadvertently removed from the hub assembly 30.

Next, as shown in FIG. 2h, the operator has manually released the handle 66, allowing the spring 97 to linearly displace and shuttle the control shaft assembly 60 in direction 121 (the "extending direction") to advance the control shaft assembly 60 into the "pre-engaged position" such that the end portion 99 and end face 199 is now protruding axially outwardly from outer face 46a to axially overlap counterbore 109 by overlap distance 117. Counterbore 109 circumscribes end portion 99, such that end portion 99 is radially retained and engaged with the left dropout 32a. Simultaneously, in this pre-engaged position, the transition surface 75 and a portion of the stepped portion 65 is now axially overlapping the pilot region 127 by overlap distance 125. Collar portion 65 is now radially retained and engaged with the dropout 32b. It may be considered that counterbore 109 and pilot region 127 both include retaining surfaces that serve to radially retain the hub assembly 30 to the dropouts 32a and 32b. It may also be considered that end portion 99 and collar portion 65 may both be considered as having retaining surfaces that serve to radially engage with their respective mating engagement surfaces. End portion 99 and stepped portion 65 may be considered as the leading edges of engagement surfaces of the control shaft 61 that are axially spaced corresponding to distance 198. As the control shaft 61 is axially shuttled, both of these engagement surfaces are simultaneously shuttled.

As the control shaft assembly 60 is axially shuttled as described, it may be preferable that this axial overlap 117 of end portion 99 be generally equal to the axial overlap 125 of the transition surface 75 so that both of these radial engagements are initiated generally simultaneously during this assembly sequence described herein. This also insures that these two radial engagements will release generally simultaneously during disassembly of the hub assembly 30 from the dropouts 32a and 32b Similarly, it may be preferable that spacing distance 197 is equal to or nearly equal to engagement distance 198 such that, as control shaft 60 is axially shuttled in direction 121, the radial overlie engagements between end portion 99 and counterbore 109 and between collar portion 65 and pilot region 127 are initiated simultaneously or nearly simultaneously.

Due to tolerances and design restrictions, it may not be possible to insure that distances 117 and 125 are absolutely equal. However, if distances 117 and 125 are within 3 millimeters or, more preferably, within 1 millimeter of each other, the control shaft assembly 60 will still be considered to have simultaneous radial engagement initiation and simultaneous radial release initiation from dropouts 32a and 32b. By coordinating and axially "timing" these two axial overlap distances 117 and 125, the radial engagement of both the handle end and the engagement end will initiate simultaneously as the control shaft assembly 60 is axially shuttled in direction 121. This reduces the possibility that the hub assembly 30 will not hang up or become misaligned as it is installed and/or removed from the dropouts 32a and 32b.

This simultaneous initiation of both of these overlie engagements causes both the control end and handle end of the control shaft assembly 60 to be optimally radially piloted and pre-engaged so that, once the pre-engagement position is initiated (by simply manually releasing the spring-loaded control shaft assembly 60), the control shaft 61 maintains its coaxial alignment such that the external threads 62 are properly aligned with internal threads 107 and the stepped portion 65 is properly aligned with the pilot region 127. Further, these two overlie engagements, which are also maintained and supported by the axial preload provided by the spring 97, provide a significant safety feature and insure that the hub assembly 30 will not become inadvertently separated or dislodged from the dropouts 32a and 32b, even if the threadable engagement between internal threads 109 and external threads 62 is not initiated. Also, outer faces 46a and 46b are now closely located between end face 103 and inboard face 38b for axial engagement between the hub assembly 30 and the dropouts 32a and 32b. The hub assembly 30 is thus also loosely retained to the dropouts 32a and 32b.

If the axial overlap 117 is significantly greater than the axial overlap 125, then the radial overlie engagement between the end portion 99 and the counterbore 109 will be axially initiated prior to the radial overlie engagement between the stepped portion 65 and the pilot region 127. Thus, during this instant, the handle end of the control shaft assembly 60 is not radially retained and may be radially displaced and offset while the end portion 99 remains radially piloted and aligned within the counterbore 109. This may allow the control shaft assembly 60 to become cocked and misaligned such that the threaded engagement between external threads 62 and internal threads 107 may also be misaligned, causing cross-threading and/or damage to the control shaft 61 and/or the adapter 100. Further, with only one overlie engagement, the safety benefit of the pre-engagement is significantly compromised and possibly defeated. Similarly, if the axial overlap 125 is significantly greater than the axial overlap 117, then the radial overlie engagement between the stepped portion 65 and the pilot region 127 will be axially initiated prior to the radial overlie engagement between the end portion 99 and the counterbore 109. Thus, during this instant, the end portion 99 of the control shaft assembly 60 is not radially retained and may be radially displaced and offset while the stepped portion 65 remains radially piloted and aligned within the pilot region 127. This may allow the control shaft assembly 60 to become cocked and misaligned such that the stepped portion 65 may bind against the pilot region 127, adversely affecting the easy assembly of the hub assembly 30 with the dropouts 32a and 32b and possibly damaging the control shaft 61 and/or dropout 32b.

Next, as shown in FIG. 2e, the operator may then manually rotate the handle 66 in direction 122, which serves to threadbly engage external threads 62 with internal threads 107 and also to advance the control shaft assembly 60 further in direction 121, serving to reduce gap 98 until grip face 73 axially abuts outboard face 40b. Outer face 46a is abutting end face 103 and outer face 46b is abutting inboard face 38b and the control shaft assembly 60 is in the engaged position. With the handle 66 in the open position as shown, the lever portions 45a and 45b may function as the "wings" of a wingnut to provide coupled manual leverage amplification for rotation of the control shaft assembly 60 about the axial axis 28. Further threadable tightening of the handle 66 in direction 122 serves to axially draw end face 103 toward grip face 73, thereby firmly clamping dropout 32b between grip face 73 and outer face 46b and firmly clamping outer face 46a against end face 103. The end portion 99 is now fully axially overlapping the adapter 100 and the stepped portion 65 is now fully axially overlapping the dropout 32b to more positively radially retain the hub assembly 30 to the dropouts 32a and 32b. With the handle 66 fully tightened as described above, the hub assembly 30 is now in the clamped position relative to dropouts 32a and 32b and the hub assembly 30 is firmly clamped and installed with the dropouts 32a ad 32b.

The stepped portion 65 is now axially overlapping the dropout 32b by distance 125' to more completely axially overlap pilot region 127 to be further radially retained and engaged with the dropout 32b. Similarly, the end portion 99 is axially overlapping the adapter 100 by distance 117' to be further radially retained and engaged with the dropout 32a. The radial retaining afforded by axial overlap distances 117' and 125' provide an added measure of safety in insuring that the hub assembly 30 remains engaged to the dropouts 32a and 32b even if the control shaft assembly 60 was threadably loosened slightly such that the axially gripping of the dropout 32b were inadvertently reduced.

Next, as shown in FIGS. 2f and 2i, the handle 66 may next be folded and pivoted about pin 67 and pivot axis 72 in direction 123 to its "closed" position to reduce the overall axial width 124 of the hub assembly 30 and to create a more aerodynamic and compact aesthetic appearance, while also reducing the propensity for inadvertent snagging on external objects. While the capability to fold handle 66 as described herein is not a requirement for proper function of this embodiment, it serves to provide the convenience of a lower profile assembly, as preferred by many cyclists.

The procedure for uninstallation and removal of the hub assembly 30 from the dropouts 32a and 32b is basically the reverse of the assembly and installation sequence just described. For removal, the handle 66 is first unfolded to the position shown in FIG. 2e. Next, the control shaft assembly 60 is unscrewed, in a direction opposite to direction 122, by manually twisting and torquing against handle 66 until the external threads 62 are disengaged from the internal threads 107, displacing the control shaft assembly 60 in direction 118 into the pre-assembled position shown in FIG. 2h. The handle 66 is then retracted and withdrawn in axial direction 118, against the preload of spring 97, to advance the control shaft in direction 118 until the snapring 64c is abutting end face 70. End face 199 is now axially coincident or inboard of end face 103 and transition surface 75 is axially coincident or outboard of outboard face 40b as shown in FIGS. 2b, 2d, and 2g. At this retracted position of the control shaft assembly 60, the end portion 99 is no longer axially overlapping the counterbore 109 and the stepped portion 65 is no longer axially overlapping the pilot portion 127 and the aforementioned radial engagements are released, permitting the hub assembly 30 to be radially removed from the frame opposite to direction 120 to complete the removal or uninstallation procedure. Since distances 117 and 125 are equal or nearly equal, the release of these two radial engagements are axially timed to initiate and occur generally simultaneously as mentioned hereinabove.

Note that, as the control shaft assembly 60 is retracted in direction 118 past the pre-assembled position, the end portion 99 is radially released from counterbore 109 simultaneous to the collar portion 65 being radially released from the pilot region 127. By coordinating these two axial overlap distances, the radial release of both the end portion 99 and the collar portion 65 will occur simultaneously as the control shaft assembly 60 is axially retracted in direction 118. This reduces the possibility that the hub assembly 30 will hang up adjacent either outer face 46a or 46b, allowing the hub assembly to be skewed or otherwise misaligned as it is removed or uninstalled from the dropouts 32a and 32b.

While the hub assembly 30 is retained to dropouts 32a and 32b with the control shaft assembly 60 in the pre-engaged position, this retained configuration normally serves as a convenience to maintain the axial alignment of the control shaft assembly 60 with respect to the dropouts 32a and 32b. The pre-engaged position also serves as a safety retaining means to restrict separation of the hub assembly 30 from the dropouts 32a and 32b in the event that the control shaft assembly 60 is inadvertantly not placed in the clamped position. While the clamped position is not required to assemble the hub assembly 30 to the dropouts 32a and 32b, the threadable assembly associated with the clamped position is preferred and serves to fortify and solidify this assembly.

While the embodiment of FIGS. 2a-n shows the control shaft assembly 60 as biased by the compression spring 97 toward the extended position, it is envisioned that the control shaft assembly 60 may alternatively be biased toward the retracted position. For example, the compression spring 97 may instead be positioned between snapring 64b and shoulder 41 to bias the control shaft assembly 60 in direction 118. It should be noted that the spring-bias provided by spring 97 as described herein provides a convenience and is not a requisite for the proper functionality of the present invention.

In addition to being axially shuttled as described, the control shaft 61 has a generally smooth circular cylindrical surface such that, in both the extended and retracted positions, the control shaft assembly 60 may be rotated relative to the sleeve 58 about the axial axis 28. Such rotation is especially beneficial when attempting to threadably engage external threads 62 with internal threads 107. Meanwhile, adapter 100 is axially and rotationally fixed to the dropout 32*a* of the frame (not shown). Thus, the axially displaceable (in directions 118 and 121) control shaft assembly 60 of the hub assembly 30 is operative to selectively engage the dropout 32*a*. It is noted that the control shaft assembly 60 is freely rotatable at all points in its axial travel. This is a preferred feature, since the control shaft 61 must be rotatable to threadably assemble the external threads 62 with internal threads 107. In an alternative design, the control shaft assembly 60 may be rotatably keyed to the sleeve 58 or another portion of the axle assembly 24 about axial axis 28 or else the control shaft assembly 60 may employ a rotationally yieldable detent mechanism relative to the sleeve 58.

The combined assembly of the sleeve 58 and axlecaps 42 and 44 serve as an outer axle assembly that is discreet from the control shaft assembly 60. This outer axle assembly is axially fixed relative to the hub shell 20, while the control shaft assembly may be axially shuttled within this outer axle assembly. Alternatively, the components of the outer axle assembly may be omitted and the control shaft assembly may be axially shuttled within the bearings 33*a* and 33*b*.

FIG. 2*j* describes an alternate dropout 136 that may be substituted for the dropout 32*a*, the adapter 100, and the nut 110. Dropout 136 is a monolithic or an integral assembly that incorporates the geometry and features of the adapter 100. Dropout 136 includes hole 140, inboard face 142, and a concave alignment surface 138. Hole 140 includes a counterbore 144 portion that extends axially from inboard face 142 through a portion of hole 140 and is of a diameter sized to accept the major diameter of external threads 62 of the control shaft 61. Hole 140 also includes an internal thread 141 portion (obscured) extending axially outboard from the base of the counterbore 144 through the remainder of the dropout 136. Internal threads 141 are sized to threadably mate with external threads 62 of the control shaft 61.

As shown in FIG. 2*a*, dropout 32*a* is of a generally conventional "slotted" design and includes an open slot 36*a* to receive a conventional hub assembly (not shown). Adapter 100 and clamp nut 110 are required to adapt dropout 32*a* to receive the hub assembly 30, as shown in FIG. 2*c*. Alternatively, dropout 136 may be substituted for the combined assembly of dropout 32*a*, adapter 100, and clamp nut 110. As shown in FIG. 2*j*, dropout 136 is purpose-built to receive the hub assembly 30 and incorporates geometry and features otherwise included in the adapter 100. These geometries and features have similar functionality to the analogous geometries and features associated with the adapter 100 and as described herein. Dropout includes inboard face 142, which corresponds to inboard face 38*a*, and alignment surface 138, which corresponds to alignment surface 106, and hole 140 with internal threads 141 and counterbore 144, which corresponds to hole 104 with internal threads 107 and counterbore 109. Dropout 136 may thus be substituted for dropout 32 and adapter 100 and clamp nut 110 to receive the hub assembly 30 as described in FIGS. 2*c-e*.

FIGS. 2L and 2*m* illustrate the interaction between the control shaft 61 and the dropout 32*b* in greater detail. For clarity and simplification of illustration, these two figures show only the dropout 32*b* and the control shaft 61, while the most of the other components of the hub assembly 30 are not shown here. FIG. 2L corresponds to the transition between the assembly sequence shown in FIG. 2*c* and FIG. 2*d*, with the shank portion 88 passing through the necked entrance region 126 of open slot 36*b* in direction 120. The shank portion 88 has a cross-sectional diameter 135 that is smaller and radially relieved relative to diameter 131. It may be seen that the slot width 37*b* is sized to let the shank portion 88 pass therethrough, however the slot width 37*b* is smaller than the diameter 131 of the stepped portion 65. As shown in FIG. 2*m*, the hub assembly 30 is further advanced in direction 120 until the alignment surface 43*b* is radially abutting and nested within alignment face 129 (as shown in FIG. 2*g*). The control shaft assembly 60 has been axially advanced in direction 121 until the stepped portion 65 is axially overlapping the pilot region 127, which corresponds to the assembly sequences of FIGS. 2*e*, 2*f*, 2*h*, and 2*i*. As illustrated in FIG. 2*m*, the stepped portion 65 has been axially shuttled to be positioned within the pilot region 127 of the open slot 36*b*. The diameter 131 of stepped portion 65 is sized to be larger than the width 37*b* of the necked entrance region 126 such that the control shaft 61 is now axially piloted and radially retained within the pilot region 127, thereby causing the hub assembly 30 to be radially retained with the dropout 32*b* and preventing the hub assembly 30 from becoming separated from the dropout 32*b*. FIG. 2*m* describes the interaction between the stepped portion 65 and the pilot region 127 in both the pre-engaged and engaged positions.

Finally, as shown in FIGS. 2*f* and 2*i*, the handle 66 may next be folded and pivoted about pin 67 and pivot axis 72 in direction 123 to its "closed" position to reduce the overall axial width 124 of the hub assembly 30 and to create a more aerodynamic and compact aesthetic appearance, while also and reducing the propensity for inadvertent snagging on external objects. While the capability to fold handle 66 as described herein is not a requirement for proper function of this embodiment, it serves to provide the convenience of a lower profile assembly, as preferred by many cyclists.

It should be noted that the spring-bias provided by spring 97 as described herein provides a convenience and is not a requisite for the proper functionality of the present invention.

As shown in FIGS. 2*b-d* and 2*g*, with the control shaft assembly 60 in the retracted position, the end portion 99 is shown to be slightly axially recessed relative to the outer face 46*a*. Alternatively, the mechanism may be arranged such that the end portion 99 may be axially flush or else axially protruding from outer face 46*a* in the retracted position.

Since it is highly desirable to allow for fast installation of the hub assembly, it is preferable to use a "fast" multiple-lead thread form for the threadable engagement between external threads 62 and internal threads 107, rather than a common conventional single-lead thread form. The embodiment of FIGS. 2*a-n* utilizes such a multiple-lead thread in the form of a double-lead thread (also sometimes termed a "twin-start" or "two-start" thread). In the example described in FIGS. 2*a-n*, it is generally preferable to utilize a double-lead or triple-lead thread form, as further increasing the number of leads may adversely reduce the axial clamping force provided by this threaded engagement.

As defined herein, a multiple-lead thread is a thread form where the number of thread leads is greater than one. Besides a double-lead, other examples of multi-lead threads are a triple-lead or a four-lead thread form, and so on. A multiple-lead thread form is sometimes alternatively termed as a "multiple-start" thread form, since the thread has a single start for each thread lead. A thread is a ridge of generally uniform section in the form of a helix on the external or internal surface of a cylinder. The lead of the thread is the axial distance that the threadable engagement will advance with one full revolution of the externally threaded part relative to a rotationally fixed internal threaded part (or vice-versa). A multiple-lead thread utilizes a corresponding multiplicity of helical thread ridges wrapping about an axial axis along the same internal or external surface of the cylinder. It is preferable that these multiple helical ridges are evenly circumferentially spaced around the cylinder. For example, the two helical ridges of a double lead are circumferentially spaced by 180 degrees, and the three helical ridges of a triple lead are circumferentially spaced by 120 degrees, and so on. While it is possible to threadably mate a multiple-lead internal thread with a single-lead external thread of larger pitch (and vice-versa), it is normally preferable that both the internal and external threads of a threadable engagement have the same pitch and the same number of leads.

Further, as defined herein, at least one of the internal and external threads of the multi-lead thread extends to wrap helically about a circumferential angle greater than 180 degrees, and preferably greater than 360 degrees, and more preferably greater than 720 degrees. These threads may be a continuous helix or they may be an interrupted helix where the thread ridge of the continuous helix is otherwise notched or a middle portion of the helical ridge is truncated or removed.

The double-lead thread is detailed in FIG. 2n, where the thread form of external thread 62 includes two helical thread ridges such that this thread has a pitch 133 and a lead 134 that is twice the pitch 133. The pitch 133 is the axial distance from the crest of one thread to the next. The lead 134 is the axial distance corresponding to one complete revolution of the control shaft 61. With conventional single-lead threads, the pitch equals the lead. With double-lead threads, the lead is twice the pitch. With triple-lead threads, the lead is three time the pitch, and so on. Given the same thread pitch, a greater number of thread leads corresponds to a steeper helix angle of the helical ridges. These terms and relationships regarding multiple-lead threads are well-known in industry. Further, the axial thread length 137 of external threads 62 is sized to provide an axial thread engagement length with internal threads 172 that is preferably greater than the pitch diameter 139 of external threads 62 and that includes multiple thread leads 134.

For clarity, many other parts of the hub assembly 30 are not shown in FIG. 2n, but it is understood that the complete hub assembly 30 is implied and is otherwise included. The internal thread 107 of the adapter 100 has a double-lead thread as well, to threadably mate with external thread 62. This means that, when internal thread 107 is threadably mated to external thread 62, a single revolution of the control shaft 61 will cause the control shaft 61 to advance by two pitches 133 and by one lead 134. In other words, the control shaft assembly 60 will advance twice as quickly (and with half the number of revolutions) with this double lead thread engagement than it would with a conventional single-lead thread engagement. Further, since a double-lead thread engagement has two thread starts, the control shaft assembly 60 will only need to rotate a maximum of 180 degrees in order to get the threaded engagement to initiate and "catch" and engage with the internal threads 107. In contrast, with a conventional single-lead engagement, the control shaft assembly 60 will need to rotate a maximum of 360 degrees in order to get the first thread to "catch" and engage with the internal threads 107. Thus, the double-lead engagement reduces the average number of revolutions of the control shaft assembly 60 needed to install and clamp the hub assembly 30 to the dropouts 32a and 32b. Further, the double-lead thread engagement has a steeper thread helix than a conventional single-lead engagement, thus reducing the potential of cross-threading between the external threads 62 and internal threads 107, as described hereinabove. Further, since the double-lead thread has two thread starts that are circumferentially opposed (by 180 degrees), this thread engagement will initiate at both starts simultaneously, which serves to immediately bring the mating threads into axial alignment, further minimizing the potential for cross-threading. Reduced potential for cross-threading reduces the possibility of thread damage and adds to the convenience, reliability, and ease-of-use for the operator.

Yet further, in order for a conventional single-lead thread engagement to achieve a comparable lead to a double-lead engagement, the thread form commonly must have much greater radial depth. This deeper thread form would remove more material from the end portion 99, thereby reducing its effective diameter and weakening the control shaft 61. In contrast, a double-lead thread does not require this deep thread form and thus results in a stronger and more robust control shaft 61. Thus, it may be seen that the double-lead thread engagement described herein is very much preferable to a conventional sing-lead thread engagement. Further, other multiple-lead thread engagements may be substituted for the single-lead or double-lead thread engagement, such as a triple-lead and quadruple-lead thread engagement, among others.

It is noted that the control shaft assembly 60 is freely rotatable at all points in its axial travel. This is a preferred feature, since the control shaft 61 must be rotatable to threadably assemble the external threads 62 with internal threads 107. However, the control shaft assembly 60 may alternatively be rotationally fixed to the sleeve 58 or else the control shaft assembly 60 may employ a rotational detent mechanism relative to the sleeve 58.

While the alignment surfaces 106 and 129 provide a convenient circular cylindrical surface to nest with the circular cylindrical surface geometry of the alignment surfaces 43a and 43b, these alignment surfaces may alternatively have a wide range of geometries, some of which may not be circular, that may create a rotationally keyed engagement therebetween. As a further alternative, the alignment surfaces 106 and/or 129 may be eliminated entirely and the control shaft 61 may instead serve to provide the radial locating interface with dropouts 32a and/or 32b.

Figure 2O:
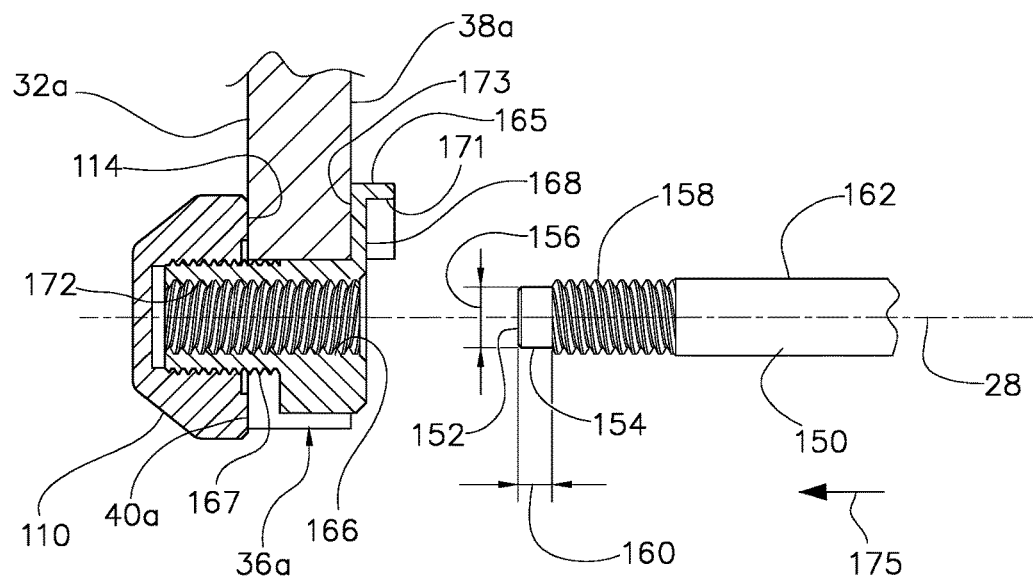
FIG. 2o is a cross sectional detail view corresponding to FIG. 2n, describing an alternate design where the counterbore is eliminated in favor of a pilot tip of the control shaft to provide piloting and pre-engagement of the control shaft with the threaded hole of the left dropout.

FIGS. 2a-n describe a design where the adapter 100 includes a counterbore 109 to radially retain the end portion 99 when the control shaft assembly 60 is in the pre-engaged position, as described in FIG. 2h. This counterbore also serves to pilot and align the end portion 99 prior to threadable engagement between external threads 62 and internal threads 107. Alternatively, the counterbore 109 may be eliminated in favor of a pilot tip 154 of the control shaft 150 to pilot and pre-engage the inside diameter of internal threads 172 as described in FIG. 2o. As shown in FIG. 2o, the control shaft 150 is identical to control shaft 61 except that the end portion 152 of the shank portion 162 includes an unthreaded pilot tip 154 of diameter 156 that projects axially outwardly from external threads 158 by axial length 160. Adapter 165 is identical to adapter 100 except that adapter 165 does not include a counterbore 109. Adapter 165 includes externally threaded collar 167, hole 166, shoulder 173, end face 168, and a concave alignment surface 171. Hole 166 includes internal threads 172 extending axially therethrough. Internal threads 172 are sized to threadably mate with external threads 158 of the control shaft 150. Clamp nut 110 and dropout 32*a* are identical to those described in FIGS. 2*a*-*n*. For clarity, many other parts of the hub assembly 30 are not shown in FIG. 2*o*, but it is understood that the complete hub assembly 30 is implied and is otherwise included.

The diameter 156 of pilot tip 154 is sized to have clearance with the inside diameter of internal threads 172 such that, when the control shaft 150 is axially shuttled in direction 175 to achieve the pre-engaged position (as described in FIG. 2*h*), the pilot tip 154 will axially overlap the internal threads 172 such that the end portion 152 will be axially overlapping and radially retained to the adapter 165 in a manner similar in effect to that described in FIG. 2*h*. The control shaft 150 may then be threadably assembled to the adapter 100 as described in FIGS. 2*e*, 2*f*, and 2*i*. It is noted that a further alternate design may include both a pilot tip of the control shaft and a counterbore of the adapter to provide an axially overlapping and radially retained engagement therebetween when the control shaft is in the pre-engaged position.

Figure 2P:
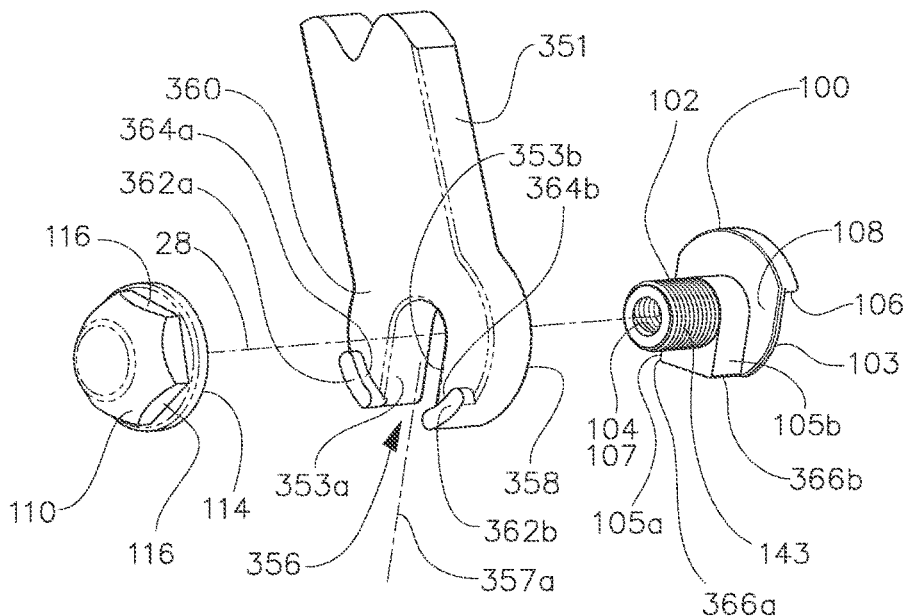
FIGS. 2p-r are perspective views of the embodiment of FIG. 2a, showing the progressive sequential assembly steps involved in assembling the adapter to the left dropout, including an alternate dropout that includes adapter retaining projections.
Figure 2Q:
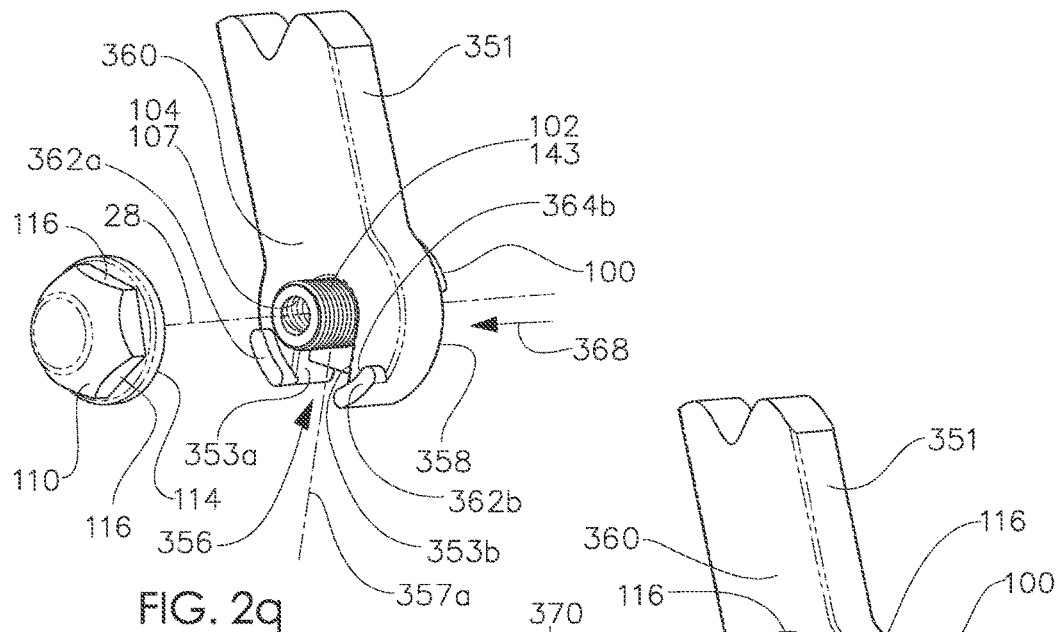
Figure 2R:
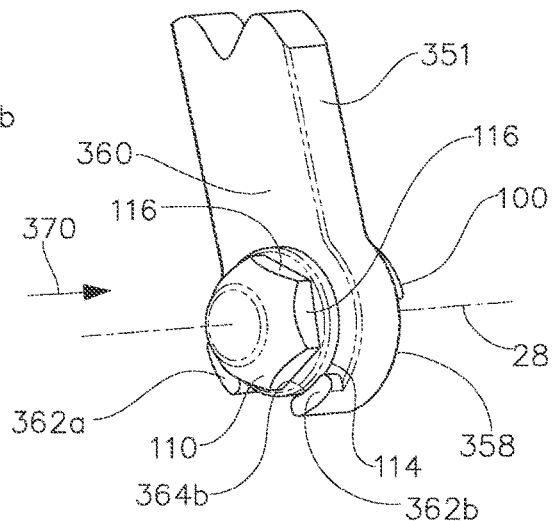

FIGS. 2*p*-*r* examine the assembly between the adapter 100 and the dropout more closely. Adapter 100 and clamp nut 110 are identical to those described in FIGS. 2*a*-*n*. Dropout 351 is identical to dropout 32*a*, except that it includes retaining tabs 362*a* and 362*b*. Dropout 351 is of a generally conventional design to include open slot 356 that is flanked by sidewalls 353*a* and 353*b* that extend parallel to slot axis 357*a*, axially inboard face 358, and axially outboard face 360. Dropout 351 also includes conventional retaining projections 362*a* and 362*b* (sometimes also called "lawyer tabs") extending axially outwardly from the outboard face 360 at a location radially adjacent the entrance of open slot 356. Dropout 351 may be substituted for dropout 32*a* as described hereinabove.

As shown in FIG. 2*p*, which corresponds to FIG. 2*a*, the adapter includes flats 105*a* and 105*b* to rotatably key and engage with sidewalls 353*a* and 353*b* respectively as described hereinabove. Flats 105*a* and 105*b* serve create a noncircular portion of the collar 102 with radially outboard corners 366*a* and 366*b* respectively, which may also be considered as radial projecting geometry of the collar 102. FIG. 2*q* shows the adapter 100 as next pre-assembled to the dropout 351 in direction 368 such that collar portion 102 is radially nested within open slot 356, with flats 105*a* and 105*b* axially overlapping and engaged with sidewalls 353*a* and 353*b* respectively. Shoulder 108 is axially abutting inboard face 358. Next, clamp nut 110 is threadably assembled to adapter 100 in direction 370 as described hereinabove. This threadable assembly serves to axially sandwich and clamp the dropout 351 between shoulder 108 and end face 114, thus maintaining the axial overlapping circumferential engagement between the flats 105*a* and 105*b* and sidewalls 353*a* and 353*b* for a rotatably keyed engagement between the adapter 100 and the dropout 351 about axial axis 28.

The clamp nut is also axially overlying the retaining projections 362*a* and 362*b* to provide a radial engagement therebetween. Thus, if the clamp bolt 110 were inadvertently slightly loosened, the retaining surfaces 364*a* and 364*b* would radially engage the clamp bolt 110 to block clamp bolt 110 (and the adapter 100) from radially exiting the open slot 356. This radial engagement serves to radially retain the adapter 100 to the dropout 351, thus providing a safety feature to further restrict adapter 100 (and the bicycle wheel (not shown) attached thereto) from becoming inadvertently separated from the dropout 351.

Since the adapter 100 is rotatably keyed to the dropout 351 about the axial axis 28, the adapter 100 will not inadvertently rotate or spin while the clamp nut 110 is threadably assembled (and disassembled) to the adapter 100 as described above. This facilitates the predictable and easy threadable assembly for the proper clamping of the dropout 351 to create a robust assembly therebetween. Secondly, after this assembly, this rotatably keyed engagement insures that the adapter 100 will not inadvertently rotate or spin while the control shaft assembly 60 is threadably tightened (or loosened) against the adapter 100 as described in FIGS. 2*e*, 2*f*, and 2*i*. This facilitates the predictable and easy threadable assembly to secure the hub assembly 30 to the dropouts 351 (or 32*a*) and 32*b*. Thirdly, this rotatably keyed engagement insures that the adapter 100 will have the proper circumferential alignment relative to the dropout 351. This is particularly important to insure that the alignment surface 106 is oriented for proper alignment with the alignment surface 43*a* as the hub assembly 30 is assembled to the dropouts 351 (or 32*a*) and 32*b* as shown in FIG. 2*d*. This rotatably keyed engagement may also be helpful in circumferentially orienting the internal threads 107 relative to the dropout 351 to control the thread start initiation position.

Without this rotatably keyed engagement, the adapter 100 may inadvertently spin as the clamp nut 110 is threadably tightened, which can change the circumferential orientation of the adapter 100. Further, the adapter 100 may spin as the clamp nut 110 is rotated and the threadable engagement between external threads 143 and internally threaded hole 112 will not properly advance, thereby hindering the proper clamped and gripped assembly with the dropout 351. This may allow this assembly to become inadvertently loosened, creating a safety concern whereby the adapter 100 (and hub assembly 30 connected thereto) may become loosened or possibly disconnected from the dropouts 351 (or 32*a*) and 32*b*.

Further, if the adapter 100 may inadvertently spin, the threadable assembly between the control shaft 61 and the adapter 100 could also be compromised and the hub assembly 30 may not be firmly clamped to the dropouts 351 (or 32*a*) and 32*b*. This may allow this assembly to become inadvertently loosened, creating another safety concern whereby the hub assembly 30 may become loosened or possibly disconnected from the dropouts 351 (or 32*a*) and 32*b*.

Still further, if the adapter 100 may inadvertently spin, the alignment surface 106 may become improperly oriented, which may hinder the easy and/or proper assembly and/or disassembly of the hub assembly 30 to the dropouts 351 (or 32*a*) and 32*b*.

The embodiment of FIGS. 2*a*-*n* includes a control shaft with an axially extending shank portion that is axially fixed to a head portion. Further, this embodiment includes external threads 62 of the control shaft 61 threadably engaged to internal threads 107 of the adapter 100, in a general arrangement as described in FIGS. 2*a*-*n*. Still further, this embodiment describes a grip face 73 that is axially clamping and gripping a dropout 32*b* or mounting portion of the frame. In contrast to the embodiment of FIGS. 2*a*-*n*, the embodiment of FIGS. 3*a*-*b* describes an internally threaded nut assembly 425 that eliminates a shank portion in favor of an axially extending hole 402 with internal threads 403. Further, the grip face 384 serves to axially grip directly against the axlecap 412*b* of an axle portion 413 instead of a dropout. Further, the arrangement of FIGS. 3*a*-*b* utilizes only a single dropout 423, with an adapter 430 that includes a central shaft 416 that serves to radially pilot axlecaps 412*a* and 412*b*.

Figure 3A:
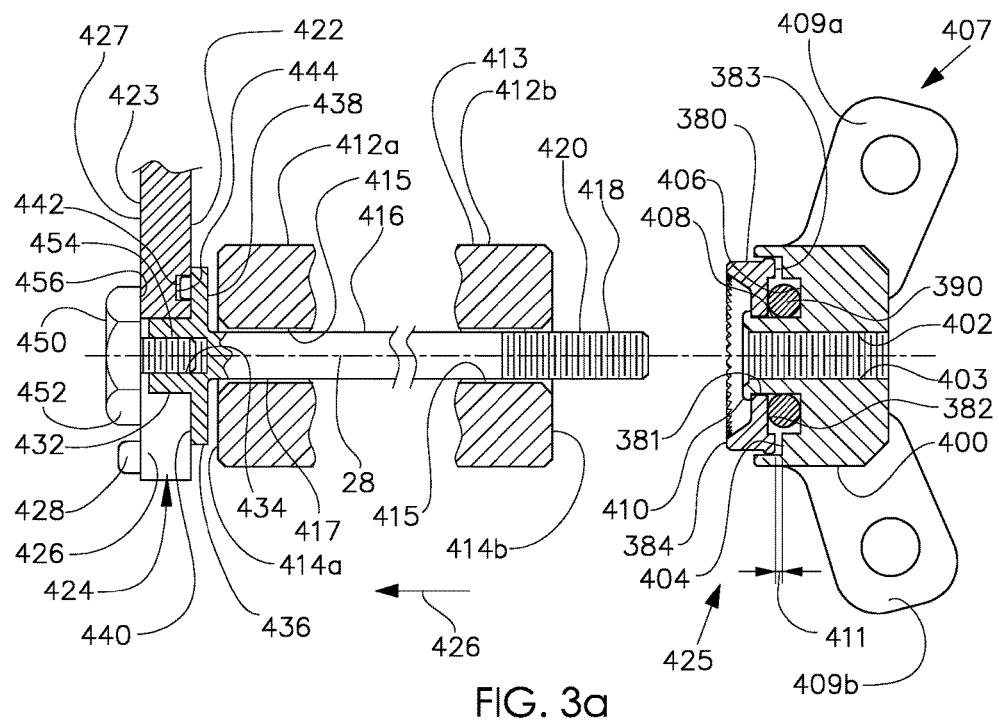
FIG. 3a is a partial axial cross section exploded view of a second embodiment of the present invention, with a nut assembly serving as a head portion that includes internal threads to mate with external threads of a central shaft, including a grip washer and a rotatable clamping flange and including an axially resilient elastomer washer axially positioned therebetween and where the central shaft is secured and rotatably keyed to the dropout.

FIG. 3a is an exploded view, showing the nut assembly 425 prior to its threadable assembly with the central shaft 416 to secure the axle portion 413 thereto. Nut assembly 425 includes nut 400, grip washer 380 and o-ring 390. Nut 400 includes: an axially extending through hole 402 with internal threads 403; a pair of handles 409a and 409b to facilitate manual manipulation of the nut assembly 425 in a manner similar to a wingnut; a recess face 406, a clamp face 404; and a collar portion 408 with a flared portion 410 that is deformably flared radially outwardly to axially retain the grip washer 380 as shown. The flared portion 410 may be considered a means to retain the grip washer 380 to the nut 400. Grip washer 380 includes a hole 381 therethrough, a grip face 384, a back face 383, and a pressure face 382. O-ring 390 is an annular element made of elastically resilient elastomer material and circumferentially surrounds the collar portion 408 and is axially positioned between the pressure face 382 and the recess face 406. The axially outward elastic preload provided by the o-ring 390 also serves to create an axial gap 411 between the back face 383 and the clamp face 404. Axlecaps 412a and 412b include outer faces 414a and 414b respectively and serve as axial end portions of an axle portion 413 with an axially extending central opening 415 therethrough. Axle portion 413 is analogous to the assembly between sleeve 58, axlecap 42, and axlecap 44 of FIGS. 2a-n. Axle portion 413 constitutes a portion of a hub assembly (not shown) that may include bearings 33a and 33b and hub shell 20 as described in FIG. 2a-n. Axle assembly 407 includes axle portion 413, adapter 430, and nut assembly 425.

Dropout 423 is similar to dropout 32a and of a generally conventional design to include open slot 424 with sidewalls 426, axially inboard face 422 with a keying relief 444, and axially outboard face 427. Dropout 423 also includes conventional retaining projections 428 (sometimes also called "lawyer tabs") extending axially outwardly from the outboard face 427 at a location radially adjacent the entrance of open slot 424. Keying relief 444 is a relief that extends axially outwardly from inboard face 422.

Adapter 430 includes an internally threaded collar portion 432 with internally threaded hole 434 and a flange 436, which includes inboard face 438 and outboard face 440. Unlike the noncircular collar 102 of FIGS. 2-r, collar portion 432 may be circular and need not necessarily be rotatably keyed with sidewall 426. Outboard face 440 includes a keying projection 442 that extends axially outwardly therefrom to axially overlap and engage with keying relief 444. Adapter 430 also includes an axially extending central shaft 416 that has a first end portion 417 fixed to flange 436 and a second end portion 418 extending to a point axially outboard of outer face 414b that includes external threads 420. Clamp bolt 450 is of a conventional arrangement that includes a hex head 452 with shoulder 456 and an externally threaded shank 454 to threadably mate with internally threaded hole 434.

Figure 3B:
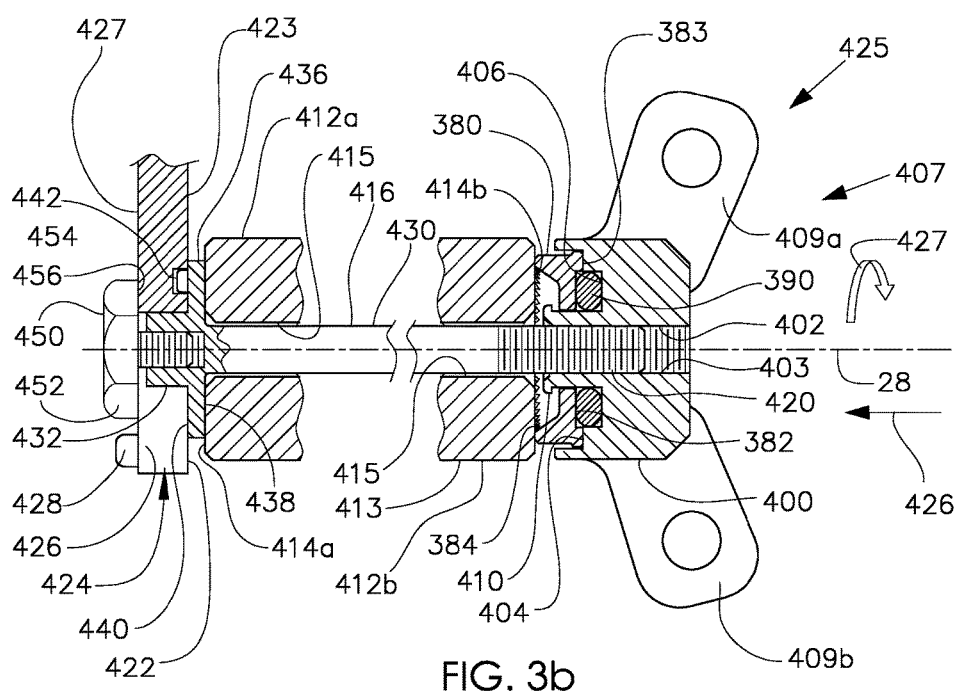
FIG. 3b is a partial axial cross section view of the embodiment of FIG. 3a, showing the hub assembly axle portion piloted on the central shaft and axially clamped to the dropout by the nut assembly.

In contrast to the embodiment of FIGS. 2a-n where the axle assembly 24 is secured between two axially spaced dropouts 32a and 32b, FIGS. 3a-b describe an axle assembly 413 that is axially cantilevered off of a single mounting portion or dropout 423. In further contrast to FIGS. 2a-n, where the adapter 100 includes internal threads 107 to receive the hub assembly 30, FIGS. 3a-b show the adapter 430 to have external threads 420 to threadably mate with internal threads 403 of the nut assembly 407.

Adapter 430 is first assembled to dropout 423 by first positioning collar portion 432 in open slot 424, with collar portion 432 radially abutting the closed end of open slot 424 and outboard face 440 axially abutting inboard face 422. Keying projection 442 is nested with and axially overlapping keying relief 444. Clamp bolt 450 is then threadably assembled to adapter 430 with externally threaded shank 454 threadably mated with internally threaded hole 434. This threadable assembly is tightened to axially clamp and sandwich the dropout 423 between shoulder 456 and outboard face 440. The axially overlapping engagement between keying projection 442 and keying relief 444 provides a circumferentially keyed engagement between the adapter 430 and dropout 423 to restrict and limit rotation therebetween about the axial axis 28. Thus, the adapter 430 will remain circumferentially fixed to the dropout 423 and will not inadvertently rotate while the clamp bolt 450 is threadably tightened. Keying projection 442 is nested with and axially overlapping keying relief 444. The adapter 430 is now firmly connected to the dropout 423.

In contrast to the embodiments of FIGS. 2a-r, where flats 105a and 105b result in radially extending projections of the collar that are axially overlapping and rotatably keyed with the straight parallel sidewalls 333a and 333b, the keying projection 442 is an axially extending projection that is axially overlapping and rotatably keyed with a keying relief 444 of the inboard face 422. The resulting benefits provided by the rotatably keyed engagement are similar to those discussed in FIGS. 2p-r. This rotatably keyed engagement between keying projection 442 and keying relief 444 insures that he adapter 430 will not inadvertently spin and rotate as the clamp bolt 450 is threadably tightened against the adapter 430. Further this rotatably keyed engagement insures that the adapter 430 will not inadvertently spin and rotate as the nut assembly 425 is threadably tightened against the adapter 430. Still further, this rotatably keyed engagement insures that the desired circumferential orientation of the adapter 430 relative to the dropout 423 is maintained.

In addition to the circumferentially keyed engagement, the axially overlapping engagement between keying projection 442 and keying relief 444 provides a radially keyed engagement to radially retain the adapter 430 to the dropout 423. Thus, if the clamp bolt were inadvertently loosened, this radial engagement would retain the adapter 430 to the dropout 423, thus providing a safety feature to further restrict adapter 430 (and the bicycle wheel (not shown) attached thereto) from becoming inadvertently separated from the dropout 423. Further, by axially overlapping the hex head 452, the retaining projections 428 provide a further redundant radial engagement between the adapter 430 and the dropout 423. Thus, if the clamp bolt were inadvertently slightly loosened, the retaining projections 428 would restrict the hex head 252 from radially exiting the open slot 424, serving to radially retain the adapter 430 to the dropout 423, thus providing a safety feature to further restrict adapter 430 (and the bicycle wheel (not shown) attached thereto) from becoming inadvertently separated from the dropout 423.

Axle portion 413 is then assembled to adapter 430 in direction 426, with central shaft 416 extending through opening 415 as shown, until outer face 414a axially abuts inboard face 438 of adapter 430. The central shaft 416 may be considered as an extension of the dropout 423 that axially overlaps the axle portion 413. Central shaft 416 may also be considered to have some similar schematic features of control shaft 61 of FIGS. 2a-n.

As shown in FIG. 3b, the nut assembly 425 has next been assembled to the central shaft 416, with internal threads 403 threadably engaged to external threads 420. As nut 400 is rotated in direction 427, the nut assembly 425 is threadably advanced in direction 426 until the grip face 384 contacts outer face 414b and the o-ring 390 is elastically deformed and compressed as shown in FIG. 3b.

Next, the nut assembly 425 is further rotated in direction 427 by means of manual manipulation of handles 409a and 409b, which serves to further threadably tighten the nut assembly 425 with the central shaft 416. This threadable tightening in direction 427 serves to rotate and further draw the nut assembly 425 in the axially inward direction 426 until the clamp face 404 contacts and abuts the back face 383 and the axle portion 413 is axially clamped and sandwiched between grip face 384 and inboard face 422. The axle assembly 407 (and hub assembly, not shown) is now firmly secured to the dropout 423.

The o-ring 390 provides a frictional coupling and an axially distal preload and bias between the recess face 406 and the pressure face 382. The axial distal preload serves to insure that the mating thread flanks of the threadable engagement remain in contact with sufficient friction and preload therebetween to impede inadvertent threadable loosening as also described hereinabove.

The rotational coupling described in FIG. 3b is a yieldable coupling and the threadable loosening and disassembly of the nut assembly 425 is simply the reverse of the sequence described hereinabove. As shown in FIG. 3b, the grip washer 380 is rotationally fixed to the stationary axle portion 413 due to the frictional interface between the grip face 384 and the outer face 414b and between the outer face 414b and the inboard face 422. The o-ring 390 serves as an axially resilient element to rotationally couple the nut assembly 425 to the dropout 423 and serves to inhibit threadable loosening of the nut assembly 425. The embodiment of FIGS. 3a-b describes a passive rotational coupling mechanism that is primarily energized by the o-ring 390. After assembly as shown in FIG. 3b, threadable loosening may only be achieved by overriding this rotational coupling mechanism. Even if threadable loosening of the nut assembly 425 were initiated, the axial resilience of this mechanism insures that this rotational coupling is maintained over an angular rotation range of the nut assembly 425 to continue to inhibit further threadable loosening.

While my above description contains many specificities, these should not be construed as limitations on the scope of the invention, but rather as exemplifications of embodiments thereof. For example:

While FIGS. 2a-r describe the adapter as rotatably keyed with the sidewall of the open slot of the dropout and FIGS. 3a-b describe an adapter that is rotatably keyed with an engagement relief in the inboard face of the dropout, it is envisioned that the adapter may alternatively be rotationally keyed to any other portion of the dropout, such as the external perimeter and/or the outboard face, etc.

While the embodiments of FIGS. 2a-r and FIGS describe the adapter as directly interfacing with the dropout to create a rotatably keyed engagement therebetween, it is envisioned that an intermediate keying element may be included in the assembly. In this case, the adapter is rotatably keyed to the intermediate keying element and the intermediate keying element is rotatably keyed to the dropout, such that the adapter is rotatably keyed to the dropout by means of the intermediate keying element.

The embodiments of FIGS. 2a-r show the adapter as rotatably keyed to a dropout with a straight slot. Alternatively, the open slot may have a wide range of slot profiles, including the keyhole slot described herein. In such a case, the adapter may include geometry that allows it to also be radially engaged to the dropout, in addition to being rotatably keyed thereto.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. An axle connector adapter assembly, comprising:
  a frame element, including a first frame member;
  a vehicle wheel axle sleeve extending along an axial axis and including an axially extending opening therein;
  an adapter, including a first threaded portion thereof;
  a shaft extending within said opening, wherein said shaft may be axially displaced relative to said axle sleeve;
  wherein said first frame member includes an open slot, with an open entrance portion, a closed terminus region, slot sidewalls extending between said open entrance portion and said closed terminus region, a slot axis, an axially outward facing first outboard face, and an axially inward facing first inboard face;
  wherein said adapter is assembled to said first frame member to include a rotationally keyed engagement between said adapter and said first frame member to limit rotation of said first threaded portion relative to said first frame member about said axial axis;
  wherein said adapter is axially and radially retained to said first frame member independently of said axle sleeve;
  wherein said axle sleeve is connected to said adapter by means of a threadable engagement with said first threaded portion; and
  wherein said adapter is a multi-piece adapter including a first adapter element to interface with said first inboard face and a second adapter element to interface with said first outboard face, and wherein said adapter is axially retained to said first frame member by means of a connection between said first adapter element and said second adapter element.

2. The axle connector adapter assembly according to claim 1, including a second threaded portion for said threadable engagement with said first threaded portion, wherein said first threaded portion is an internal threaded opening with internal threads and said second threaded portion is an external thread.

3. The axle connector adapter assembly according to claim 2, wherein said internal threads extend to axially overlap said sidewalls.

4. The axle connector adapter assembly according to claim 2, wherein at least one of: (i) said axle sleeve includes a pilot tip adjacent said engagement end and wherein said pilot tip is sized to have radial clearance with the inside diameter of said internal threaded opening such that said pilot tip may axially overlap said internal threaded opening; and (ii) said adapter includes a counterbore axially aligned with and axially inboard of said internal threads, and wherein said counterbore is sized to have radial clearance with the outside outside diameter of the engagement end such that said axle sleeve may axially overlap said counterbore of said adapter.

5. The axle connector adapter assembly according to claim 1, wherein said adapter includes a collar portion positioned within said open slot and axially overlapping said sidewall, wherein at least a portion of said collar portion includes noncircular geometry that is noncircular about said axial axis; wherein said noncircular geometry is rotationally keyed to at least one of said sidewalls to limit rotation of said adapter relative to said first frame member about said axial axis.

6. The axle connector adapter assembly according to claim 5, wherein said open slot is a U-shaped slot with generally parallel slot sidewalls straddling said open entrance, and wherein said non-circular geometry includes a generally flat portion to engage at least one of said sidewalls.

7. The axle connector adapter assembly according to claim 1, wherein said adapter includes an axially projecting engagement surface to axially overlap and engage an engagement surface of said first frame member that is adjacent to at least one of said first inboard face and said first outboard face, to provide said rotationally keyed engagement.

8. The axle connector adapter assembly according to claim 1, wherein said rotationally keyed engagement also provides an axial overlying engagement to limit radial displacement of said adapter relative to said first frame member.

9. The axle connector adapter assembly according to claim 1, wherein at least one of: (i) said adapter element includes an axially extending first engagement surface that engages an axially extending second engagement surface of said first frame member; and (ii) said adapter element includes a radially extending first engagement surface that engages a radially extending second engagement surface of said first frame member; including a circumferential blocking engagement between said first engagement surface and said second engagement surface, to provide said rotationally keyed engagement.

10. The axle connector adapter assembly according to claim 9, wherein said adapter includes a first engagement surface for said rotationally keyed engagement, wherein one of said first adapter element and said second adapter element is a unitary adapter element, wherein said first engagement surface and said first threaded portion are formed directly in said unitary adapter element.

11. The axle connector adapter assembly according to claim 1, wherein said first adapter element is threadably connected to said second adapter element in a second threadable engagement, wherein said second threadable engagement may be threadably adjusted to axially sandwich and grip said first frame member between said first adapter element and said second adapter element, and wherein said second threadable engagement is between external threads of said first adapter element and internal threads of said second adapter element.

12. The axle connector adapter assembly according to claim 1, wherein said first adapter element is threadably connected to said second adapter element in a second threadable engagement, wherein said second threadable engagement may be threadably adjusted to axially sandwich and grip said first frame member between said first adapter element and said second adapter element, and wherein said second threadable engagement is between internal threads of said first adapter element and external threads of said second adapter element.

13. The axle connector adapter assembly according to claim 1, including an axial overlie between said adapter and said first frame member to provide an overlie engagement therebetween to radially retain said adapter to said first frame member.

14. The axle connector adapter assembly according to claim 1, wherein said adapter includes an axially inwardly projecting alignment surface to provide a radial locating interface with said axle sleeve.

15. The axle connector adapter assembly according to claim 1, wherein said frame element includes a second frame member axially spaced from said first frame member, and wherein said second frame member provides radial support to said axle sleeve.

16. The axle connector adapter assembly according to claim 1, including a binding element, wherein said adapter includes said shaft to project axially inwardly from said first frame member to receive said axle sleeve, wherein said binding element is retained to said shaft to axially retain said axle sleeve to said shaft.

17. The axle connector adapter assembly according to claim 1, wherein said shaft includes a second threaded portion, and wherein said axle sleeve is connected to said adapter by means of said threadable engagement between said first threaded portion and said second threaded portion.

18. The axle connector adapter assembly according to claim 1, wherein at least one of: (i) said first adapter element extends within said open slot to connect to said second adapter element; and (ii) said second adapter element extends within said open slot to connect to said first adapter element.

19. The axle connector adapter assembly according to claim 1, including a second threaded portion for said threadable engagement with said first threaded portion, wherein said second threaded portion is an internal threaded opening with internal threads and said first threaded portion is an external thread.

20. The axle connector adapter assembly according to claim 1, wherein said at least one of said first adapter element and said second adapter element is a unitary adapter element to include said shaft formed directly in said unitary adapter element.

\* \* \* \* \*